(12) United States Patent
Damle

(10) Patent No.: US 7,571,177 B2
(45) Date of Patent: Aug. 4, 2009

(54) METHODS AND SYSTEMS FOR AUTOMATED SEMANTIC KNOWLEDGE LEVERAGING GRAPH THEORETIC ANALYSIS AND THE INHERENT STRUCTURE OF COMMUNICATION

(75) Inventor: Aditya Damle, Cambridge, MA (US)

(73) Assignee: 2028, Inc., Cambridge, MA (US)

( * ) Notice: Subject to any disclaimer, the term of this patent is extended or adjusted under 35 U.S.C. 154(b) by 776 days.

(21) Appl. No.: 10/467,251

(22) PCT Filed: Feb. 8, 2002

(86) PCT No.: PCT/US02/03723

§ 371 (c)(1),
(2), (4) Date: Dec. 12, 2003

(87) PCT Pub. No.: WO02/063493

PCT Pub. Date: Aug. 15, 2002

(65) Prior Publication Data

US 2004/0093328 A1    May 13, 2004

Related U.S. Application Data

(60) Provisional application No. 60/267,463, filed on Feb. 8, 2001.

(51) Int. Cl.
*G06F 7/00* (2006.01)
*G06F 17/00* (2006.01)

(52) U.S. Cl. .................. 707/102; 707/101; 707/103 R; 715/531

(58) Field of Classification Search ............... 707/100, 707/3, 5, 501.1, 101–103 R; 715/501.1; 706/55
See application file for complete search history.

(56) References Cited

U.S. PATENT DOCUMENTS

| 5,708,825 A | * | 1/1998 | Sotomayor | 715/501.1 |
| 5,768,578 A | * | 6/1998 | Kirk et al. | 707/100 |
| 6,012,053 A | * | 1/2000 | Pant et al. | 707/3 |
| 6,012,056 A | * | 1/2000 | Menlove | 707/5 |
| 6,018,736 A | * | 1/2000 | Gilai et al. | 707/6 |
| 6,327,590 B1 | * | 12/2001 | Chidlovskii et al. | 707/5 |
| 6,446,061 B1 | * | 9/2002 | Doerre et al. | 707/3 |
| 6,493,663 B1 | * | 12/2002 | Ueda | 704/9 |
| 6,556,983 B1 | * | 4/2003 | Altschuler et al. | 706/55 |
| 2002/0111941 A1 | * | 8/2002 | Roux et al. | 707/3 |

* cited by examiner

*Primary Examiner*—John E Breene
*Assistant Examiner*—Giovanna Colan
(74) *Attorney, Agent, or Firm*—Eckert Seamans Cherin & Mellott, LLC; David C. Jenkins, Esq.

(57) ABSTRACT

A system that processes a collection of one or more documents and thereby constructs a knowledge base is described. The system leverages innovative graph theoretical analysis of documents leveraging the inherent structure in communication. Through the generation of the automated knowledge base the system is able to provides intra-document analysis such as variable summarization and indexing, document key concepts, better filtering and relevance matching on a semantic level for documents, context dependant directories, document categorization, better basis for natural language processing, new knowledge and information through the amalgamation of the data (collection intelligence).

22 Claims, 30 Drawing Sheets

2700

```
┌─────────────────────────────────────┐
│ Input generated knowledge base from a│──2702
│ collection of documents using        │
│ techniques from previous figures     │
└─────────────────────────────────────┘
                  │
                  ▼
┌─────────────────────────────────────┐
│ Determine user conceptual profiles and│──2704
│ conceptual communities leveraging web│
│ logs, user collections, etc.         │
└─────────────────────────────────────┘
                  │
                  ▼
┌─────────────────────────────────────┐
│ Create models of users based on      │
│ conceptual interest leveraging       │──2706
│ knowledge from a variety of different│
│ sources, such as: different web logs │
│ from different sites                 │
└─────────────────────────────────────┘
                  │
                  ▼
┌─────────────────────────────────────┐
│ Infer a more complete conceptual     │──2708
│ profile of a new user from minimal data│
└─────────────────────────────────────┘
```

FIG. 27

METHODS AND SYSTEMS FOR AUTOMATED SEMANTIC KNOWLEDGE LEVERAGING GRAPH THEORETIC ANALYSIS AND THE INHERENT STRUCTURE OF COMMUNICATION

I. CROSS REFERENCE TO RELATED APPLICATIONS

This application claims priority from its related provisional application Ser. No. 60/267,463 titled "Methods and Systems for Automated Semantic Knowledge", filed on Feb 8, 2001.

II. FIELD OF THE INVENTION

The present invention relates generally to systems for automatically generating semantic knowledge from data and documents, and in particular, systems that permit efficient, rapid search, retrieval, categorization, summary and semantic processing of documents and other information-containing media.

III. BACKGROUND OF THE INVENTION

The rapid growth of both individual and public information has complicated the access of relevant, useful data in a coherent and efficient manner. Thus, for example, a user who types in the words "health" and "studies" in the search window of a conventional search engine on the world wide web is likely to obtain a listing of thousands of largely irrelevant entries concealing the few entries in which the user might actually be interested. Conventional systems do not enable the user to utilize the context of stored information to simplify the search process. Some attempt to help users refine his search, but not in a manner that is natural or intuitive. For example, summaries generated by prior art systems between two documents of a short length that are only slightly different from each other, differ from each other by just a few sentences. It will be seen that the short summaries generated by conventional systems are actually the same.

Prior Art systems also created a summary of the document, using sentences and/or sentence fragments from the document. Sentences can be ranked according to "core ideas" they contain, the relationships that they express, and are then scored using the information generated. This gives context to the summary. Although others previously have attempted to use a sentence weighting measure before to determine summaries, typically they were unable to determine whether a sentence actually made a significant conceptual relation to a given document. Also, such systems are unable to create variable length summaries in such a way that smaller summaries are more conceptually compact.

Accordingly, it is an object of the invention to provide methods and systems that will enable individuals to deal with large amounts of information in a coherent manner by creating better methods and systems to search, file, retrieve, and organize information. Such systems will allow users to search across large databases such as the Web and obtain highly relevant information regarding user-specified concepts and topics.

It is another object of the invention to provide such methods and systems whose ability to generate relevant results improves as the number of database items increases.

It is a further object of the invention to provide such methods and systems that suggest to the user further search terms and/or strategies to help the user focus his or her search.

It is still a further object of the invention to provide such methods and systems that automatically generate coherent, intelligent summaries of documents.

It is still a further object of the invention of provide such methods and systems that allow for greater intra-document analysis such as automatically generated indexes for books.

It is yet another object of the invention to provide such methods and systems that advantageously exploit the inherent structure of information communication. Examples of inherent structure in information include sentence structure, paragraph structure, and website construction.

It is still a further object of the invention to provide such methods and systems that can be used to organize a collection of documents in a coherent manner for an individual user, a group, or a network.

It is yet another object of the invention of provide such methods and systems that amalgamate the collected information in new ways to generate new knowledge and information such as collective concept maps or as comparative conceptual relevance with respect to time, technical level, sources, etc.

It is another object of the invention to provide such methods and systems that are simple and transparent for users to operate.

IV. SUMMARY OF THE INVENTION

These and other objects are attained by the invention that provides methods and systems that generates semantic knowledge by grouping terms which are central and terms that are peripheral to a database and devising strengths in their relationships. This process is further iterated until a semantic relevance relationship between such terms or concepts in the documents is defined.

The invention also provides conceptual graphs from the set of directed conceptual relations. It places the relationships within the context of the information structure of the document and obtains a subset of the relationships. These relationships are the basis for the semantic knowledge web. The system then uses the previously obtained semantic ordering to determine the semantic direction of the relations, from general to specific. In other words, if a relationship exists between two concepts, the system uses their semantic relevance to determine which of the two is more general and which is more specific. In addition to semantic relevance, other heuristics can also be used to determine the semantic ordering of the relationship; and the context of a concept relationship also can be utilized. This can be determined by examining how the set of concept relationships relate to each other to create a 3-tuple that has the form (context, concept, sub-concept).

In accordance with a further aspect of the invention, a document is also "categorized" as, e.g., a "reference document" or "gallery document", etc. This is accomplished by examining the document context. Thus, for example, a reference document would have numerous HTML links distributed throughout the document or contain large amounts of bibliography references.

In another aspect, the system utilizes techniques to remove "noise" from a given document by an analysis of the structure of a document. This is especially useful in the context of the web, where an article is usually presented with a large amount of unrelated information (i.e., "noise"). The system accomplishes this by leveraging the grouping (usually some table structure), determining the local hierarchy of such, determining how the information is distributed through this structure, and then deciding what part of the document is actually attempting to convey information. This can be enhanced by an original pass of the "semantic relevance filter" to understand the semantically relevant concepts, and then to see how they are distributed through the local hierarchy of the document structure.

In one aspect of the invention, the invention provides a system that automatically constructs summaries of documents of varying length and conceptual orientation. A summary can be conceptually targeted to selectively favor or disfavor a particular concept, or set of concepts, or to favor or disfavor particular semantic relationships between sets of concepts. In yet another embodiment, the invention provides strategies for understanding the semantic relevance of a concept to a particular document, as well as understanding the semantic relationships between concepts, where "topological information" is available. Topological information links two or more documents together in some fashion. Topological information can be links on the worldwide web, or can be the to/from information in email. The topology is directed, since there is an originator of a link and the receiver of a link.

In another embodiment the system provides the construction of adaptive directories that utilize the general/specific conceptual relational information. These structures are quite unlike conventional structures (e.g., Yahoo!), and instead are auto-generated, based upon available information. This enables directories for sets of concepts to be generated for any conceptual depth and for any set of relations. Thus, directories for various sets of concepts can be automatically created.

Thus, the system provides automatically generated synopses, semantic relevance, concept relationships, and a context-based directory. The system can be configured to apply itself to a document or website over and over again, to generate further refined results.

In another embodiment of the invention, the system also enables the amalgamation of the semantic web and documents to generate new knowledge and information. This is collection intelligence as further described later in the specification.

(i) Applications and Uses

The system described herein can be applied to a website(s), an individual's or group's email, intranets, and other collections of documents. Thus, the system processes the documents, learning concepts and conceptual relations. The system can also exploit the topological information of the website (i.e., internal links in the website).

The structured database functions of the system could also be utilized to create new structures. Thus, for example, users could specify a universe of concepts and collect articles and information from the Internet, based on that specification. Alternatively, users could use the system to organize their collection of documents such as their own web-space or PC.

It will be recognized that the system generates an "adaptive index" that can be applied to a collection of documents on the web, or an individual's web space or desktop. Additional information, links and functions can be added. A further example of use of the system would be an application to find evidence of how a particular stock reacts to certain kinds of news.

Additional applications would include categorized message boards; and filtering (e.g., a child filter) that would block certain types of information, improved web caching through conceptual analysis, better predictive/behavioral models of users, analysis of conceptual flows and conceptual coherency of sets of information such as websites.

In a further aspect, the invention examines, among other things, the order of information gathering. The system could be used as a search engine for intranets, or for e-commerce; identifying e-commerce sites and matching documents from different suppliers. It could also be used as a search engine for sites that would list sites in order of relevance. The invention can provide self correcting information, in that if only one instance or example is provided, information could be lost, but as the number of examples increases, knowledge develops, and correction can be provided.

In a further aspect of the invention, this information is utilized to provide additional search utilities and suggestions for search, e.g., "see more documents like this" or "you may wish to try the following concepts." The invention thus utilizes similarity analysis between data structures, looking for hierarchical structure and finding relationships between hierarchies.

Further aspects of the invention, its nature and various advantages are shown and described in the accompanying drawings and written description. The specification and attached drawing figures present the invention at various levels of enabling detail, from conceptual to specific examples of implementation. It will be appreciated by those skilled in the art that the present invention may be practiced in connection with details that differ from the specific examples of implementation set forth herein. By way of example, those skilled in the art will appreciate that the methods, systems and devices described herein can be implemented in devices, systems and software other than those depicted or described herein, and that the examples provided set forth herein are provided by way of illustration rather than limitation. In other instances, conventional or otherwise well-known structures and devices are described by way of reference to known or conventional software or hardware engineering terminology.

V. BRIEF DESCRIPTION OF THE DRAWINGS

FIG. 1 is an overview of the system showing the different concepts of the invention.

FIG. 2 describes the intra document analysis performed by the invention.

Figure 14:
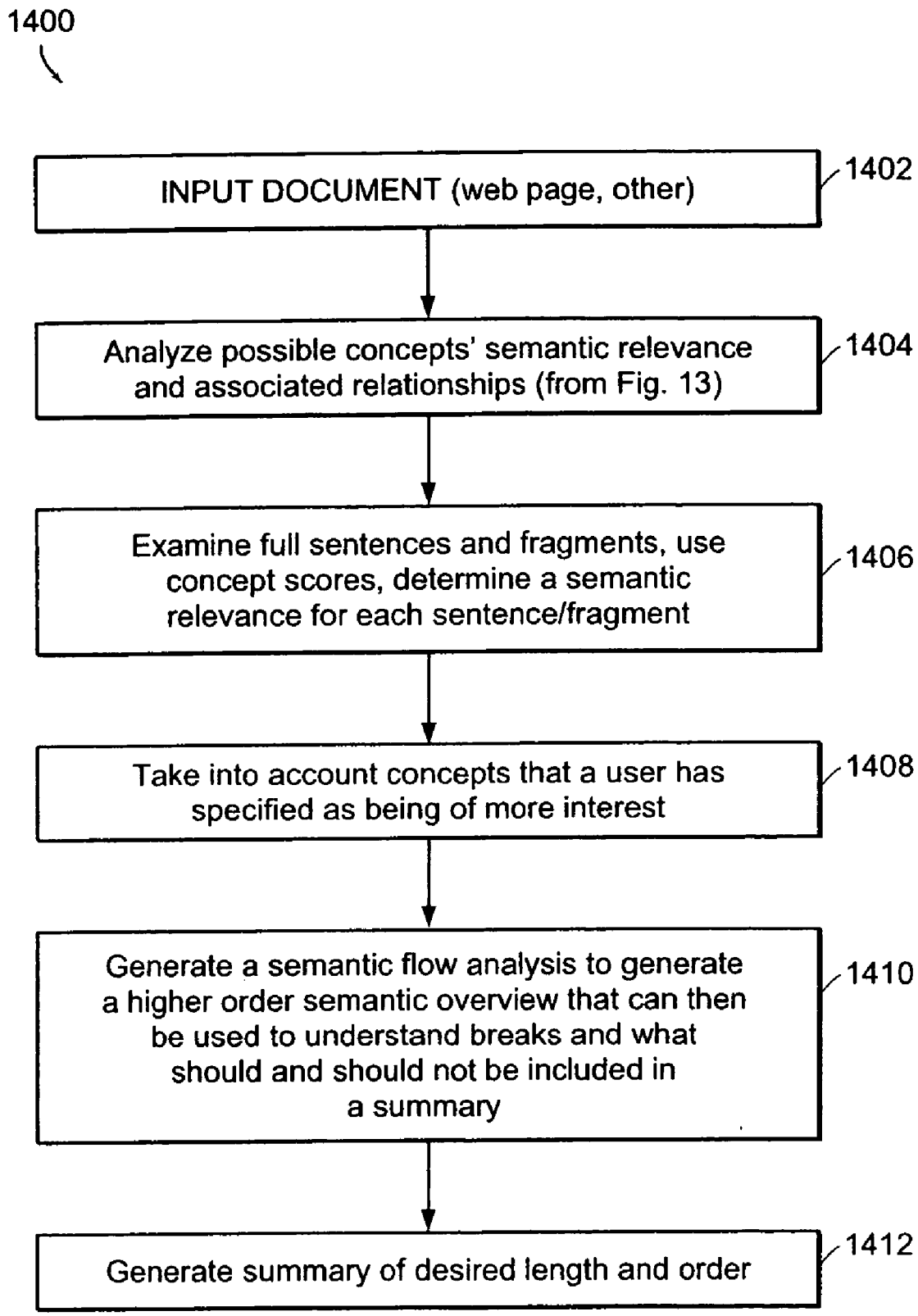

FIG. 14 flowchart depicting the process flow for summary generation.

Figure 15:
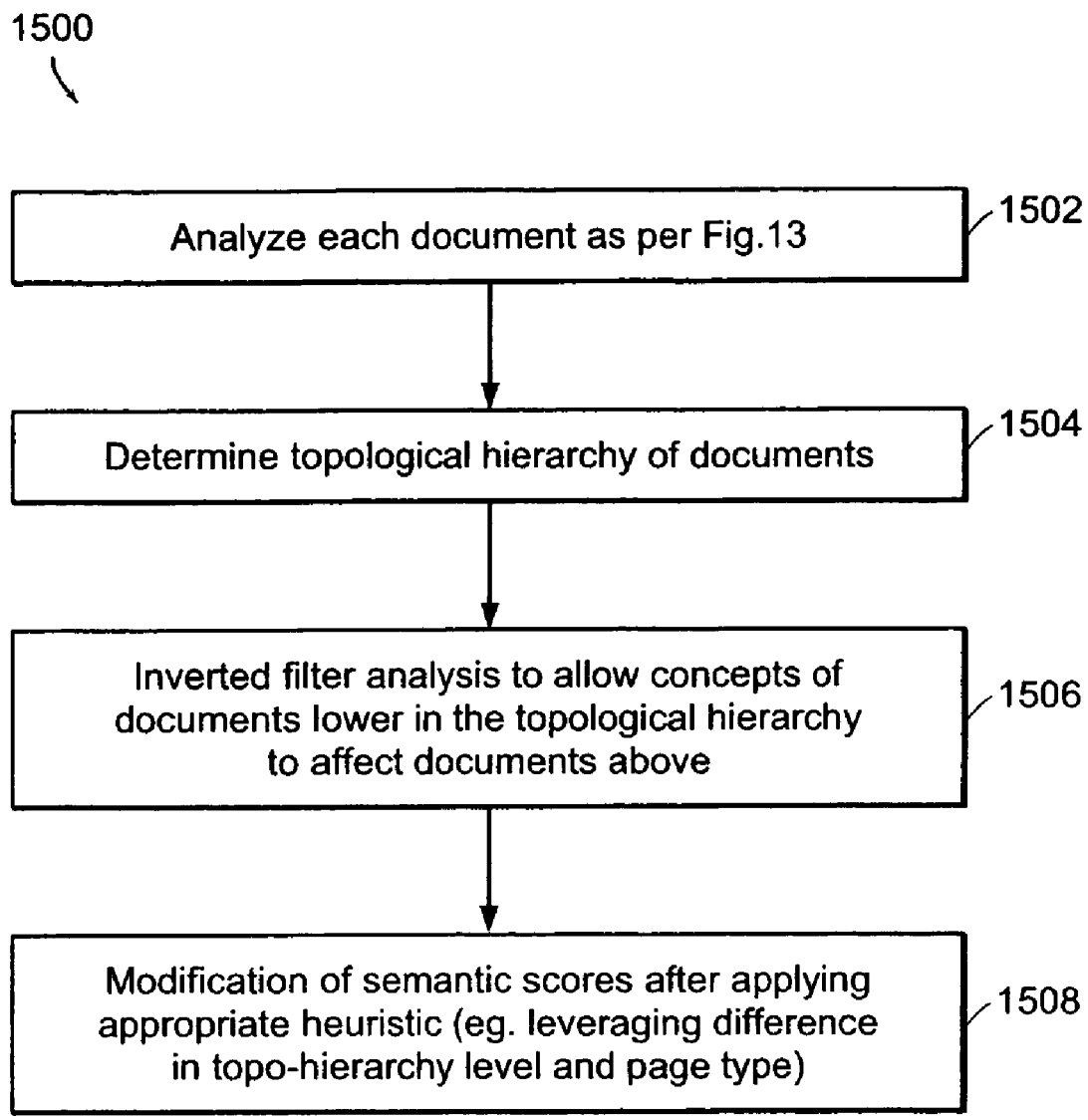

FIG. 15 is a flowchart depicting the steps involved in inter-document analysis.

Figure 16:
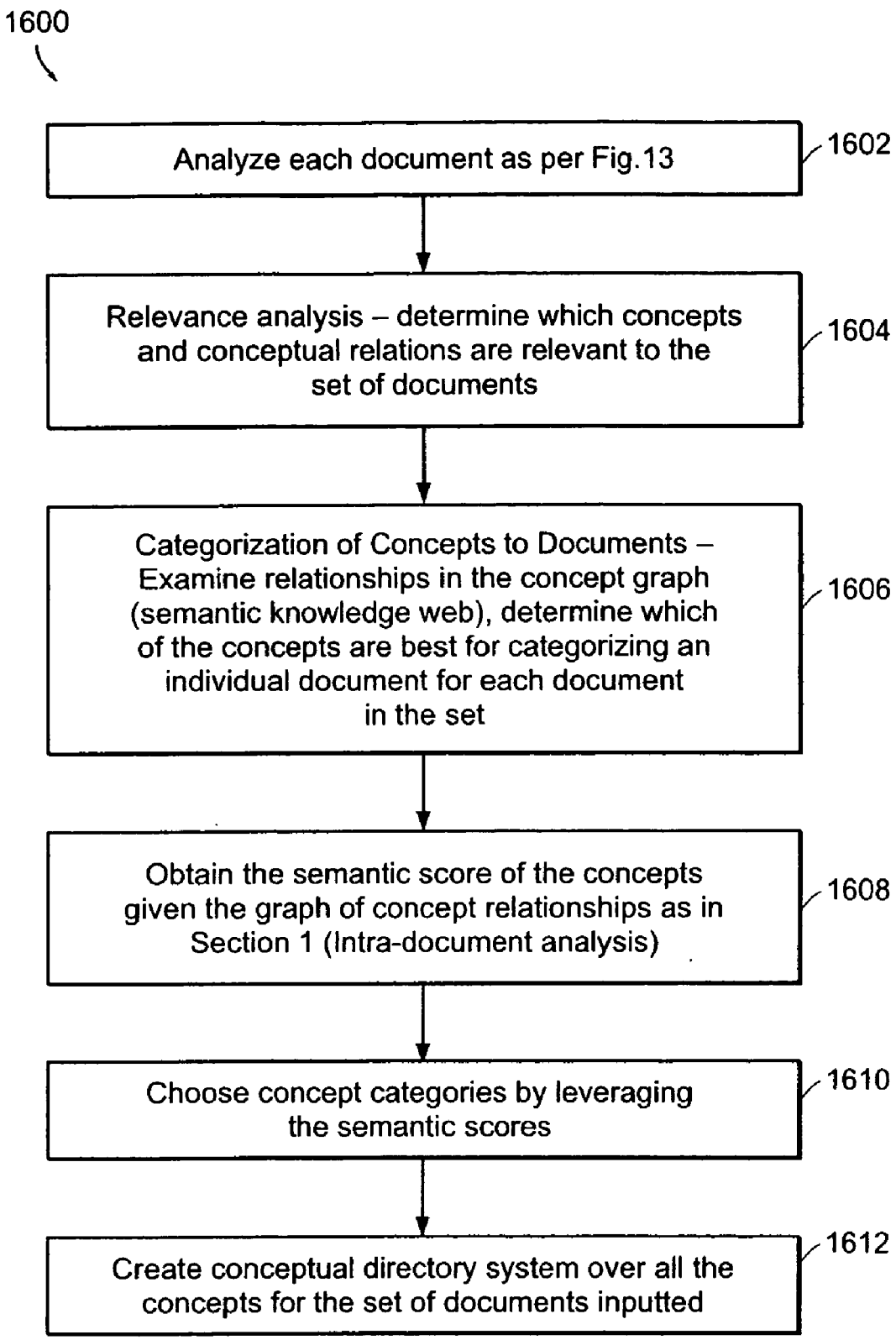

FIG. 16 is a flowchart depicting document categorization.

Figure 17:
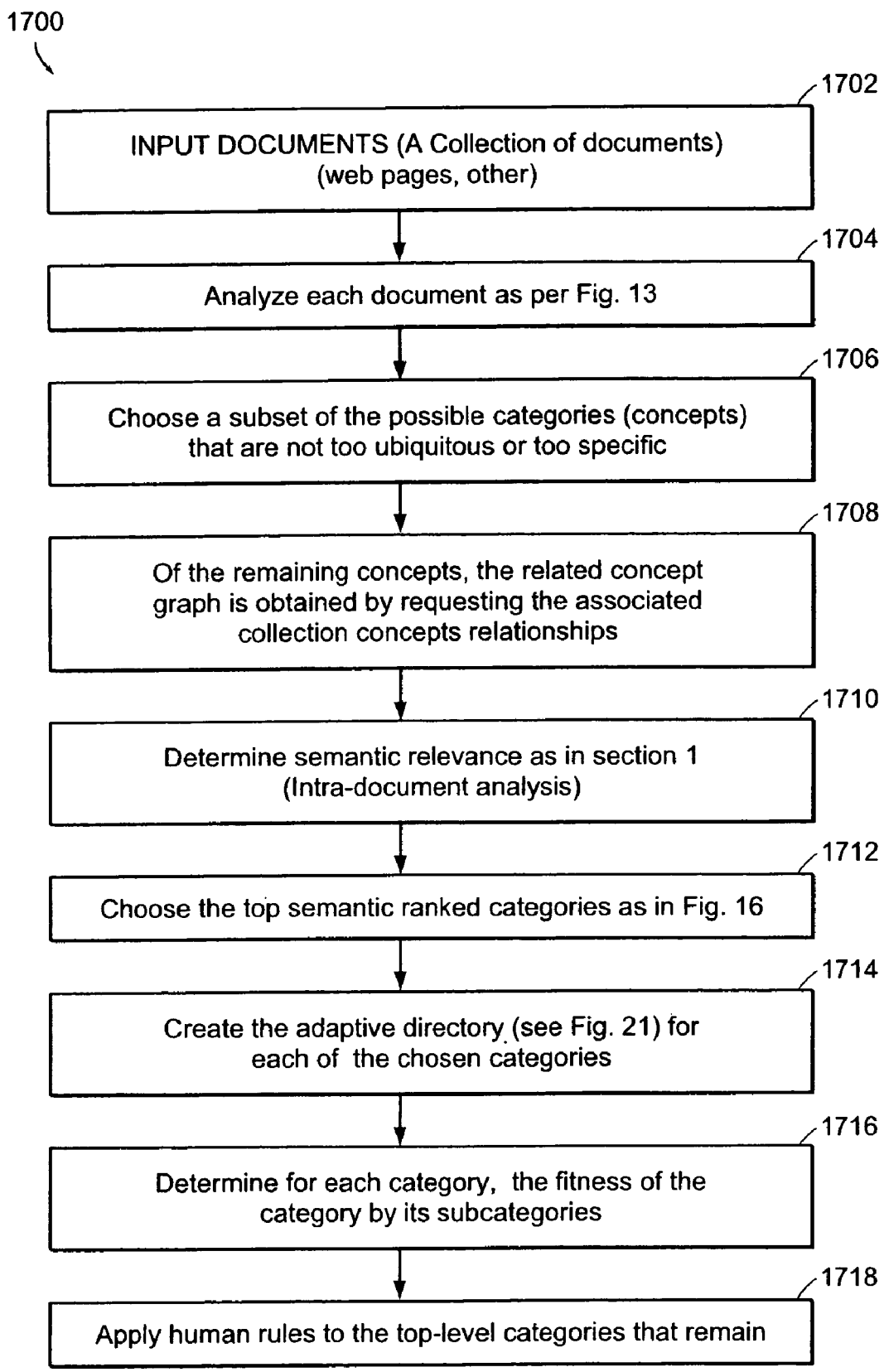

FIG. 17 is a flowchart generalizing and inferring new knowledge (depicting a collection dictionary).

Figure 18:
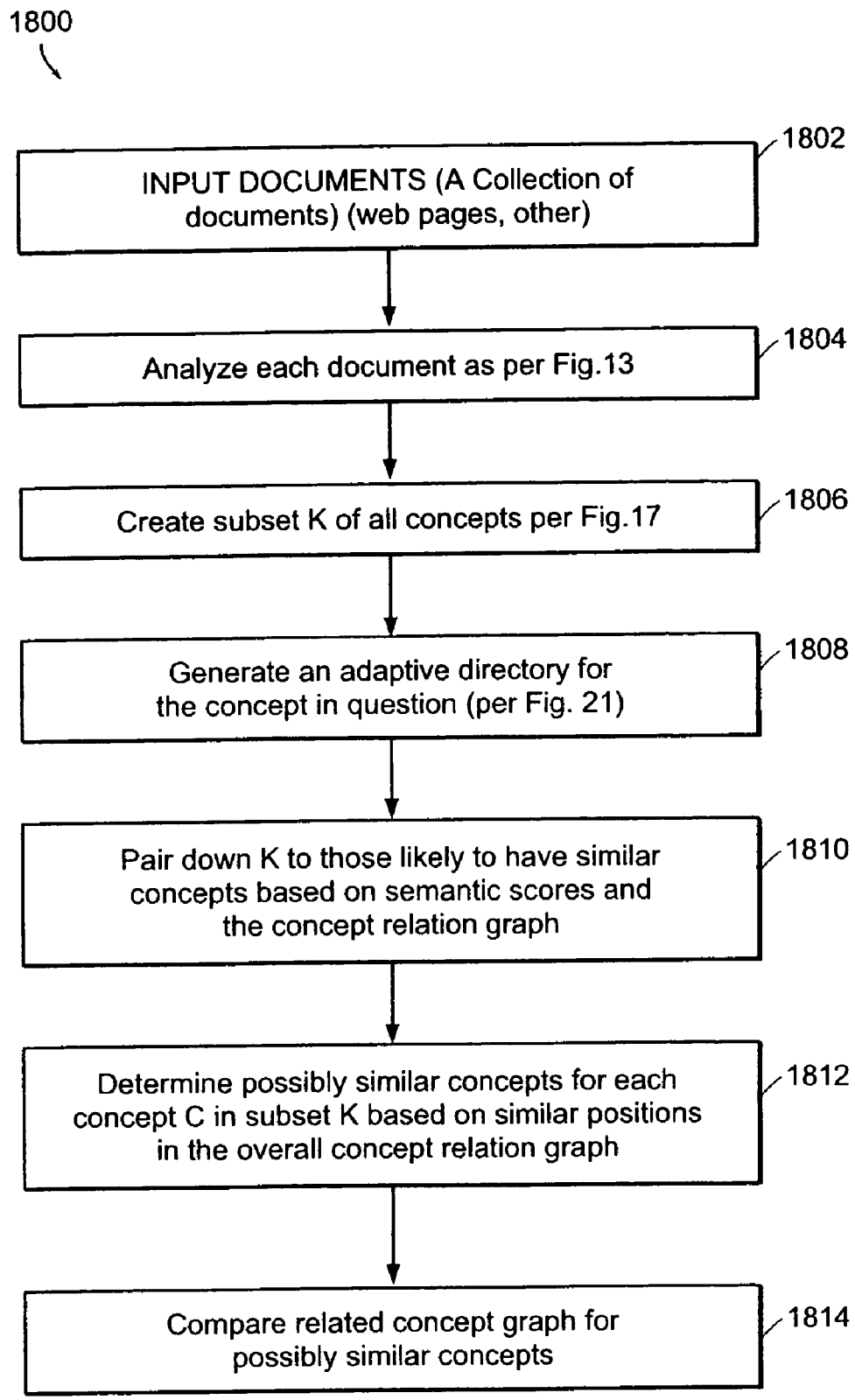

FIG. 18 is a flowchart generalizing and inferring new knowledge (similar concepts).

Figure 19:
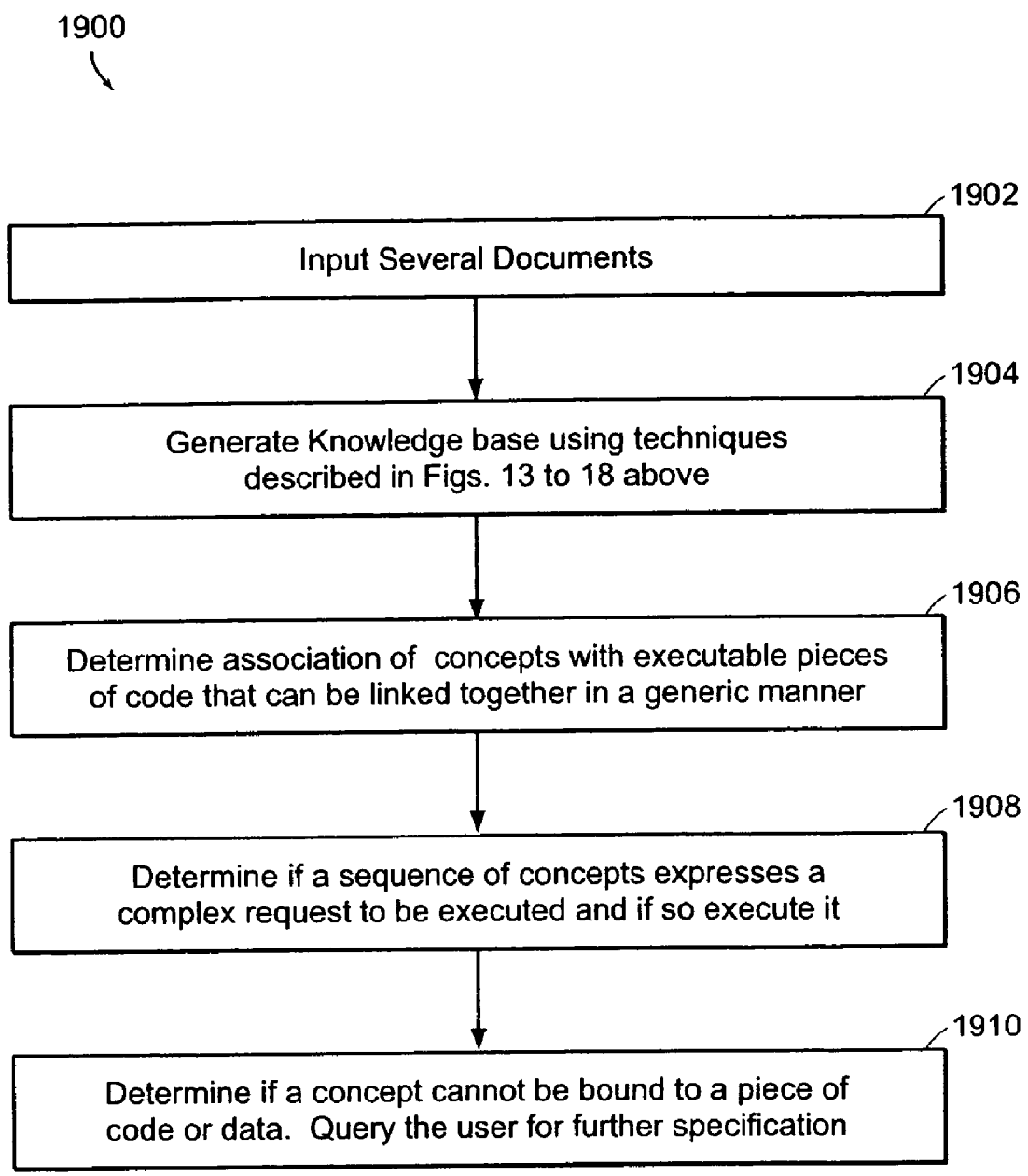
Figure 20:
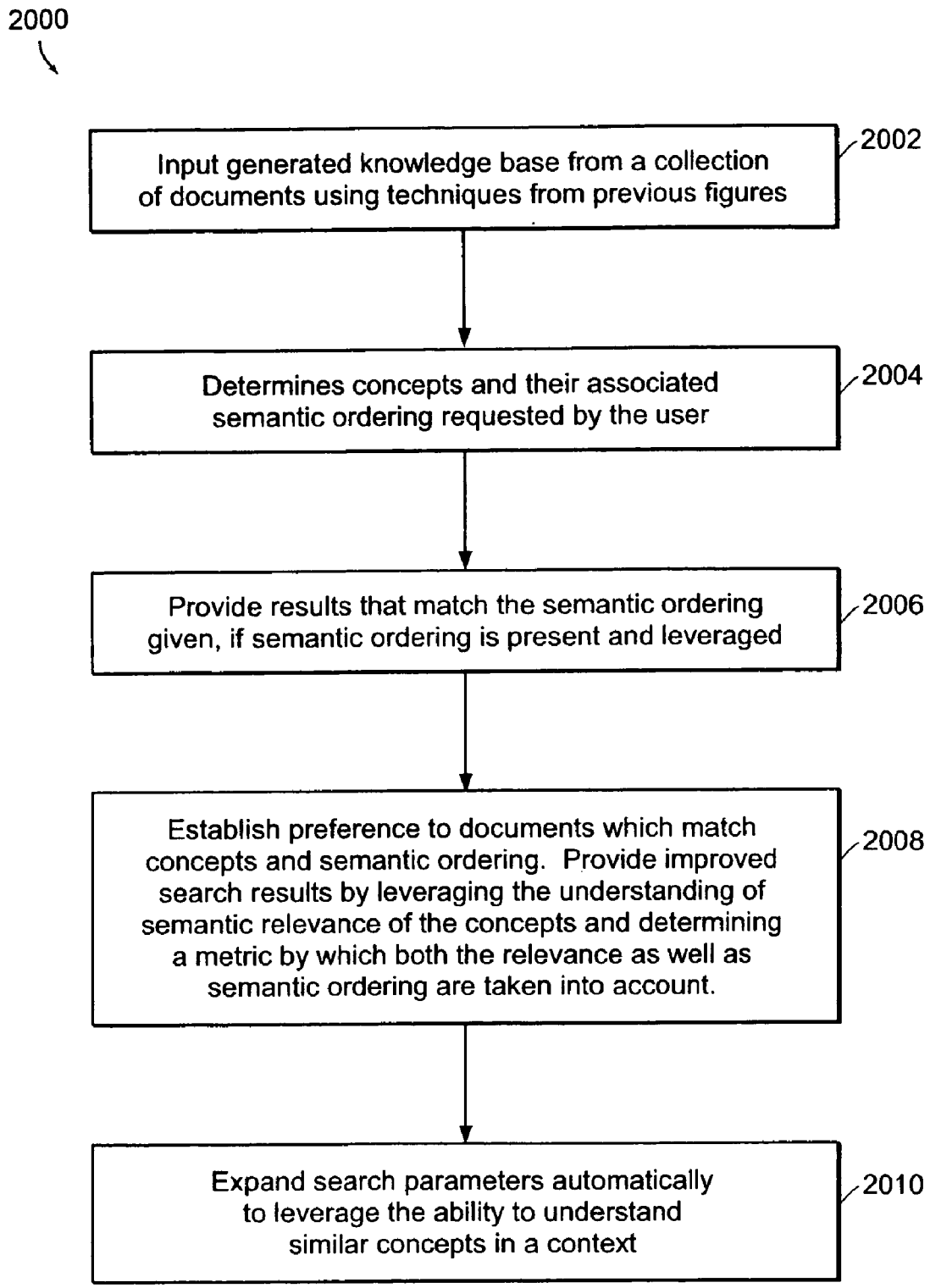
Figure 21:
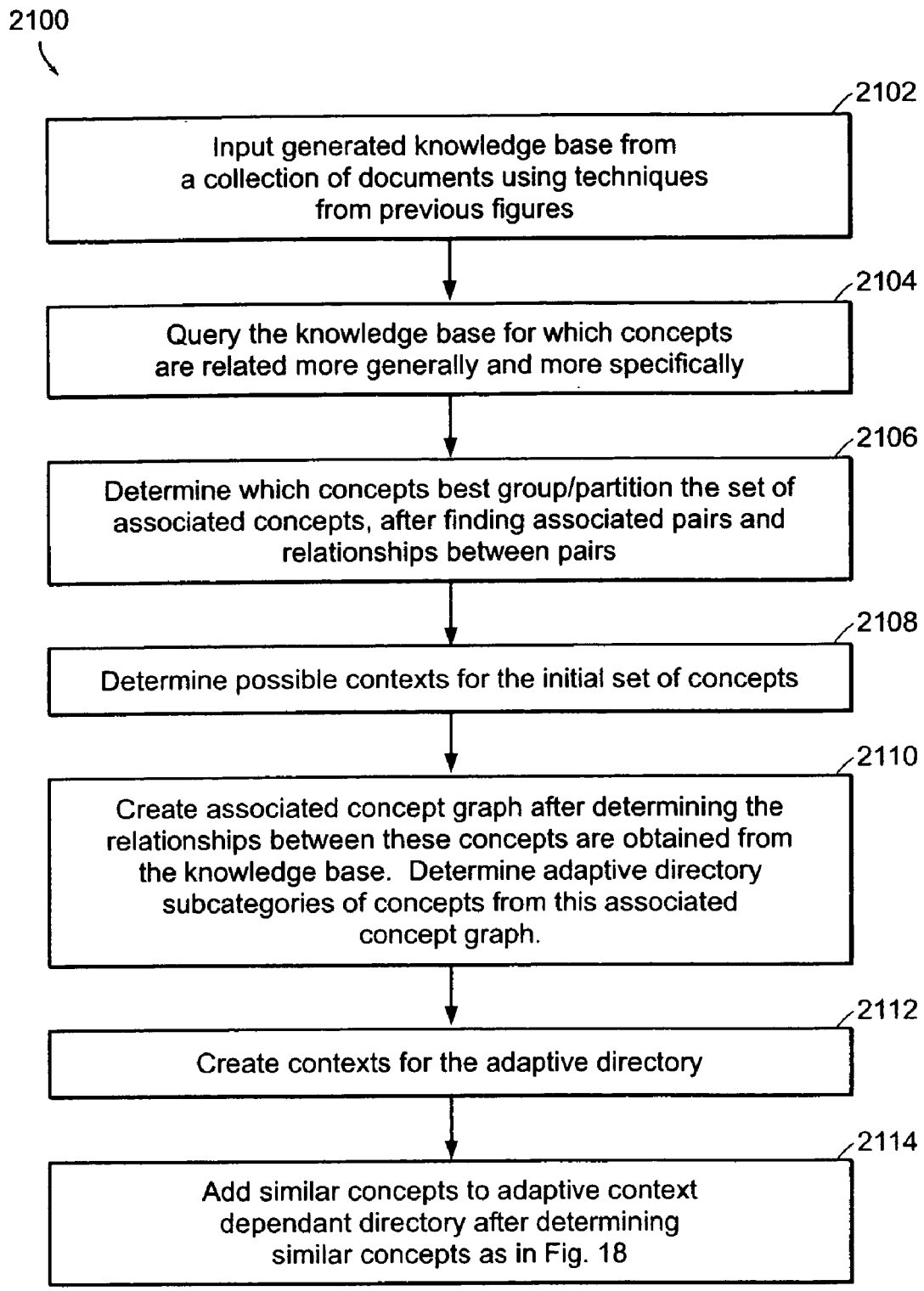
Figure 22:
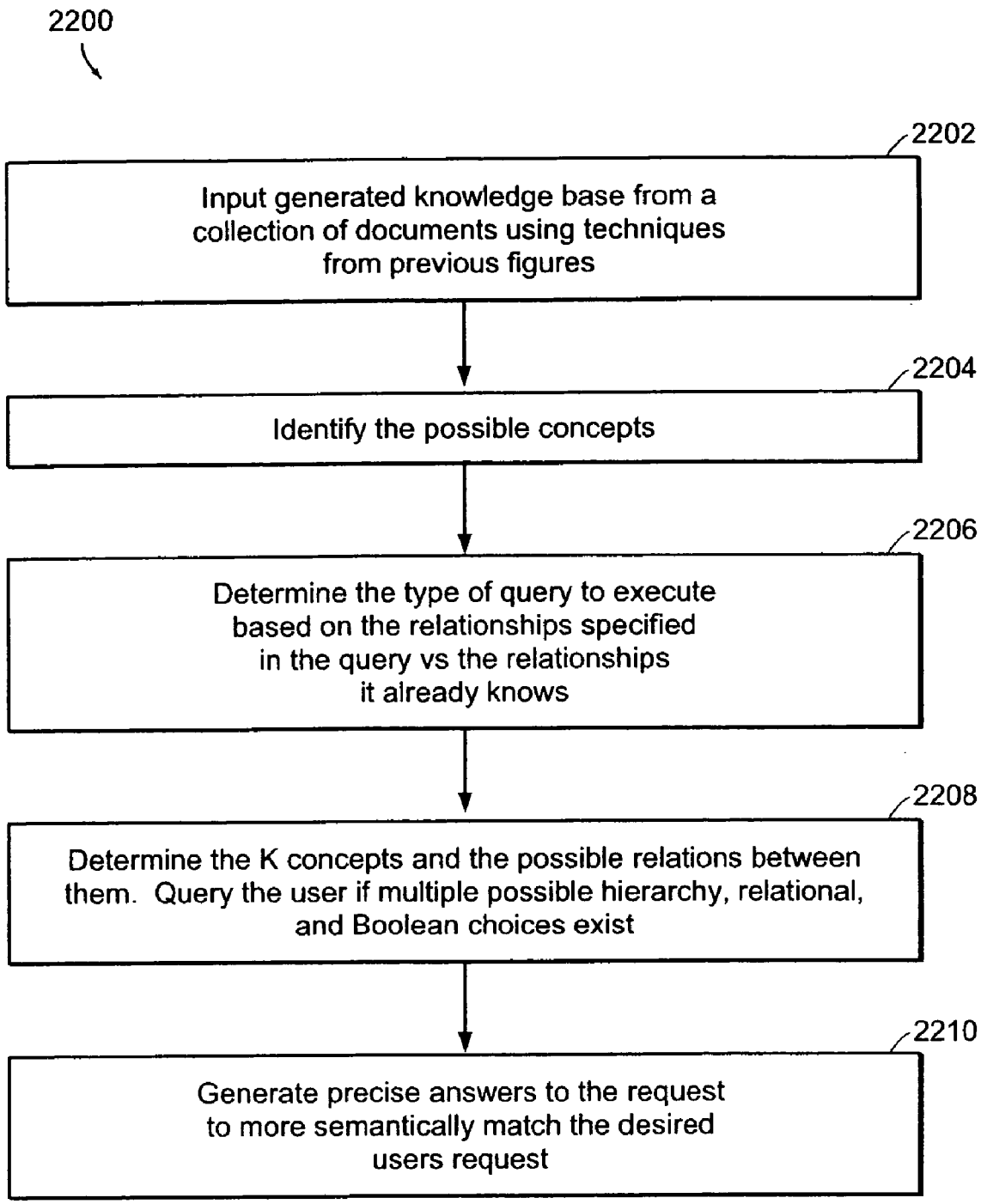
Figure 23:
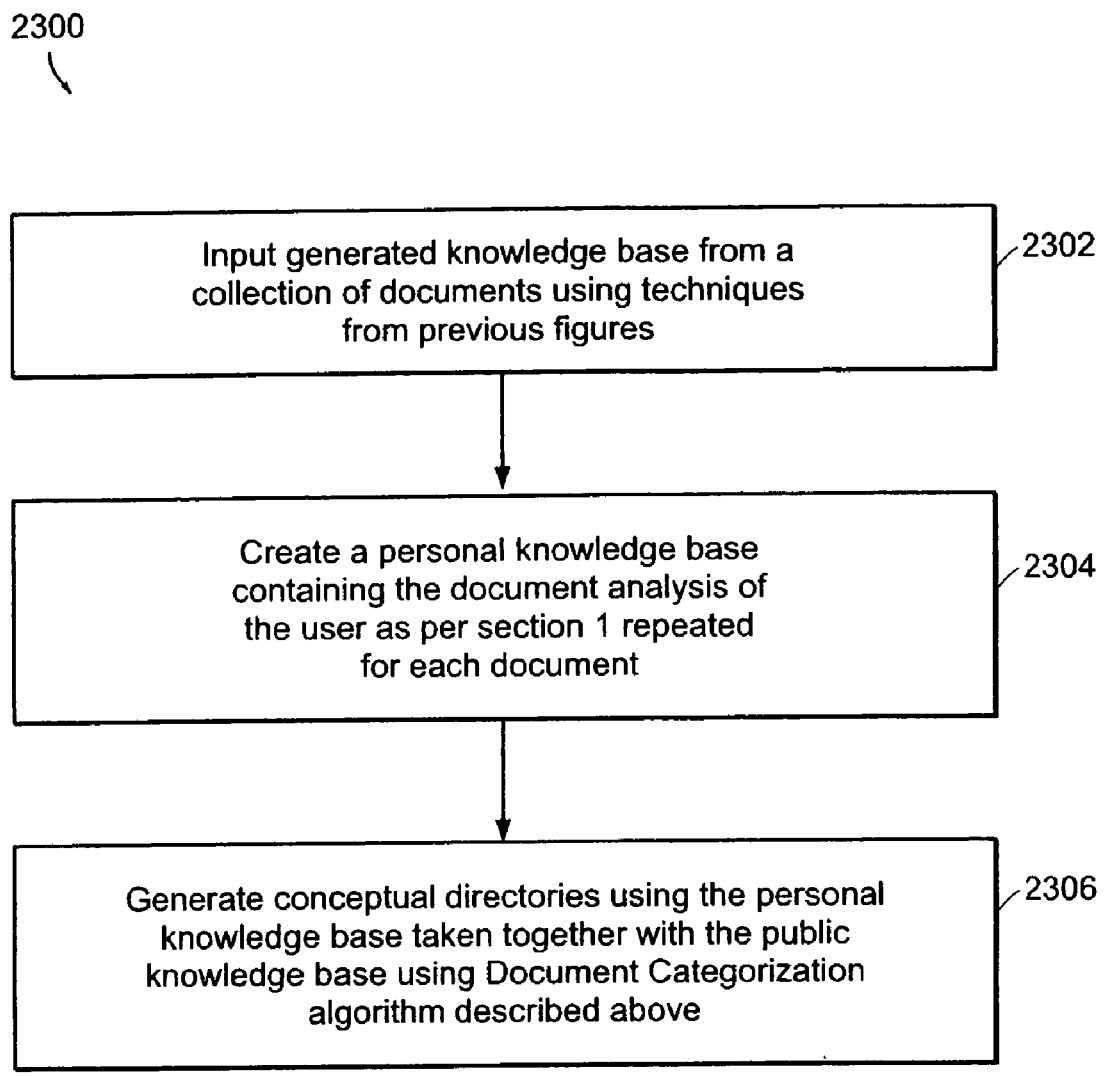
Figure 24:
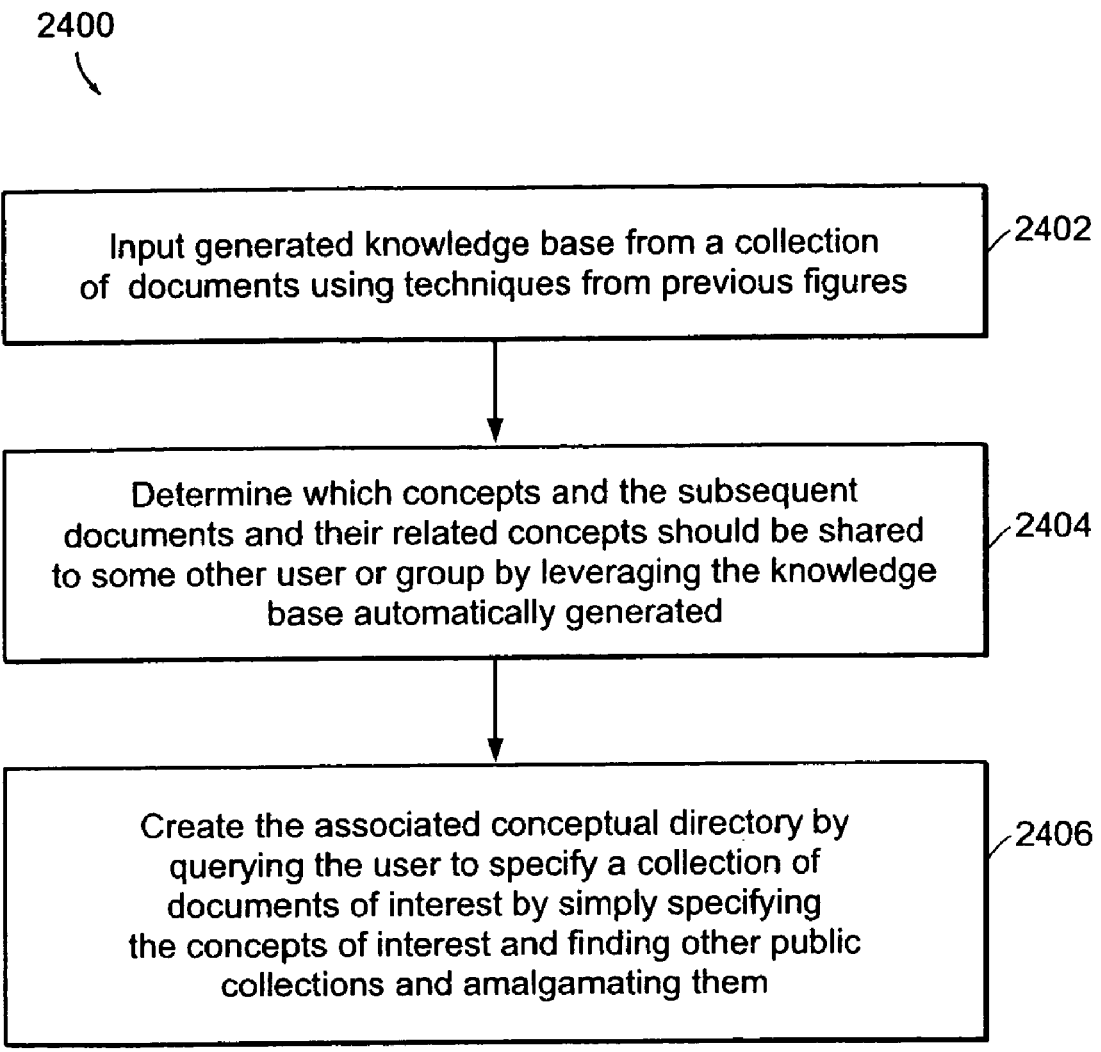
Figure 25:
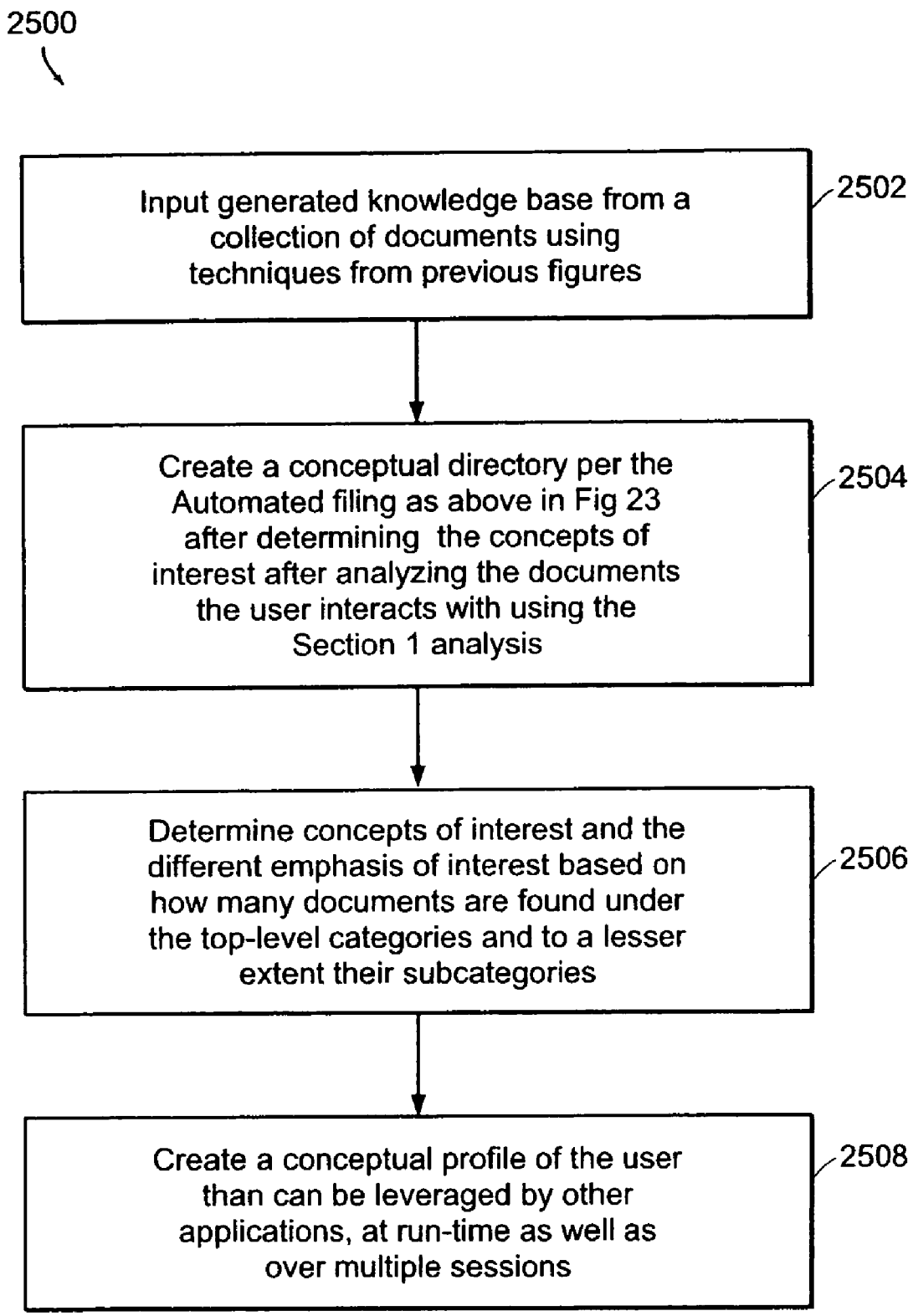
Figure 26:
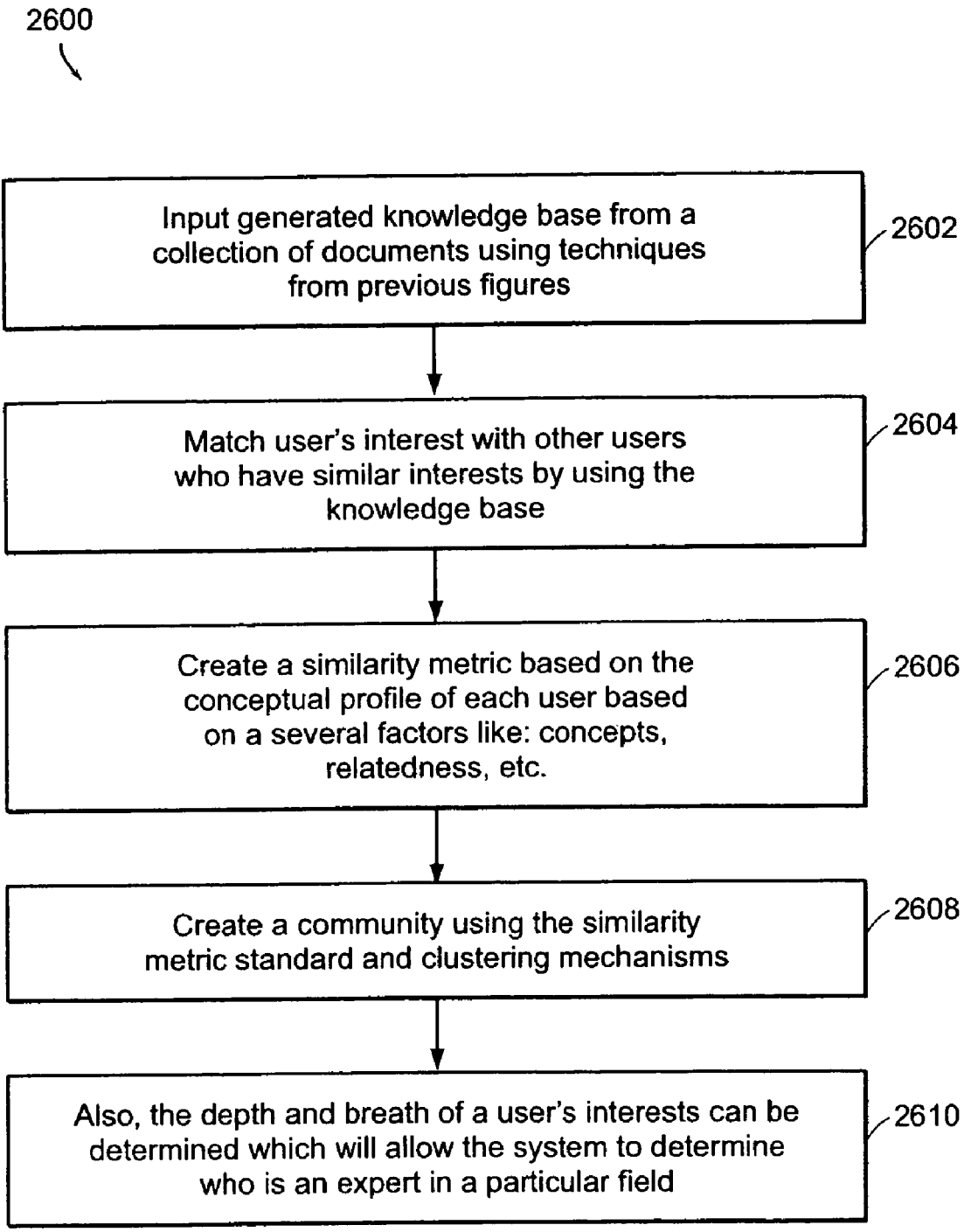
Figure 28:
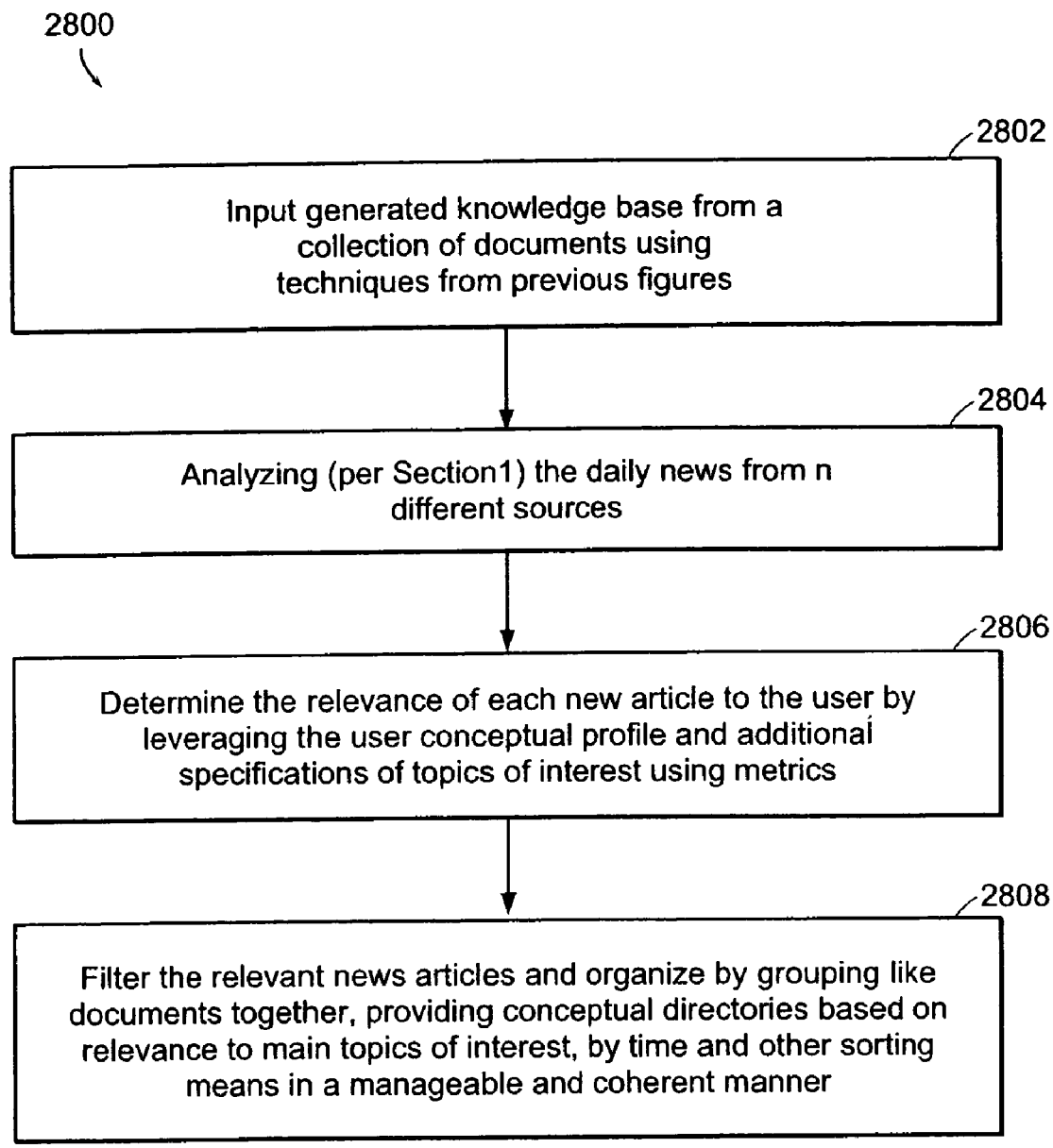
Figure 29:
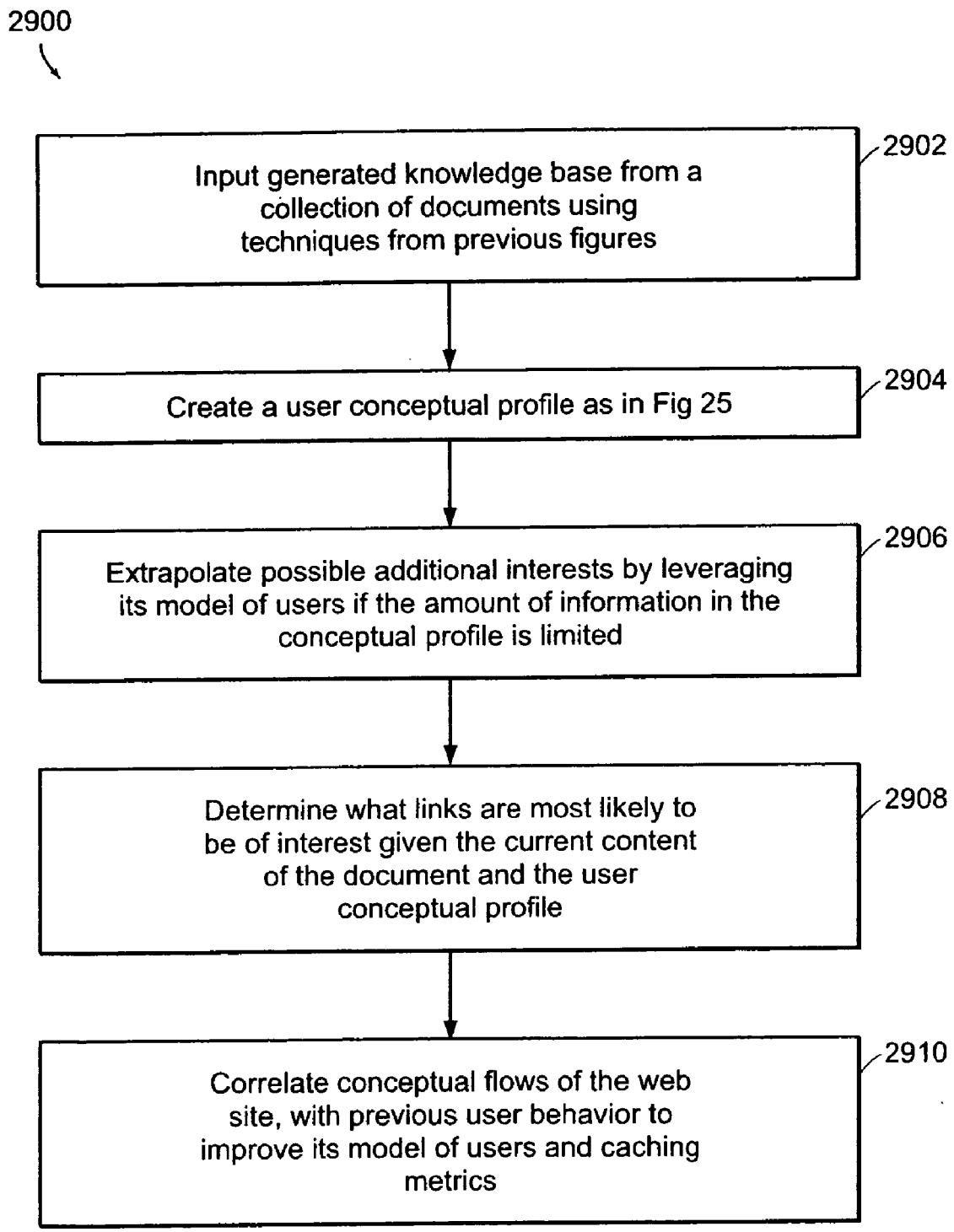

FIG. 19 is a flowchart depicting user interfaces.
FIG. 20 is a flowchart for searching.
FIG. 21 is a flowchart for adaptive directory (concept maps).
FIG. 22 is a flowchart for natural language querying.
FIG. 23 is a flowchart for automated individual and group filing.
FIG. 24 is a flowchart for concept sharing.
FIG. 25 is a flowchart for user profiling.
FIG. 26 is a flowchart depicting conceptual communities.
FIG. 27 is a flowchart depicting conceptual models of users.
FIG. 28 is a flowchart for depicting personalized news.
FIG. 29 is a flowchart depicting caching.

VI. DETAILED DESCRIPTION OF THE INVENTION (i) Overview

These and other objects are attained by the invention, which provides methods and systems that generates semantic knowledge from processing collections of documents. Documents are viewed as a collection of symbols, whose structure determines the relationships between the symbols. The invention processes documents, and in response generates a set of concepts (grouped symbols), their associated semantic relevance to the document, and a set of conceptual relationships having both weight and direction, and which are placed in context when appropriate. The invention utilizes graphical analysis of the proximity of concepts (grouped symbols) and/or symbols (words) to each other, whether in a given document or across a collection of documents such as a website, to generate results for a concept-driven search, or to generate summaries of information contained in either a given document or across a set of documents. The system thus generates a "semantic web of knowledge" for concepts. The system evaluates the semantic relevance of concepts to a particular document and a collection of documents, as well as how such concepts are related together by the document(s); and the scope of the semantic knowledge generated by the invention can be varied.

Figure 1:
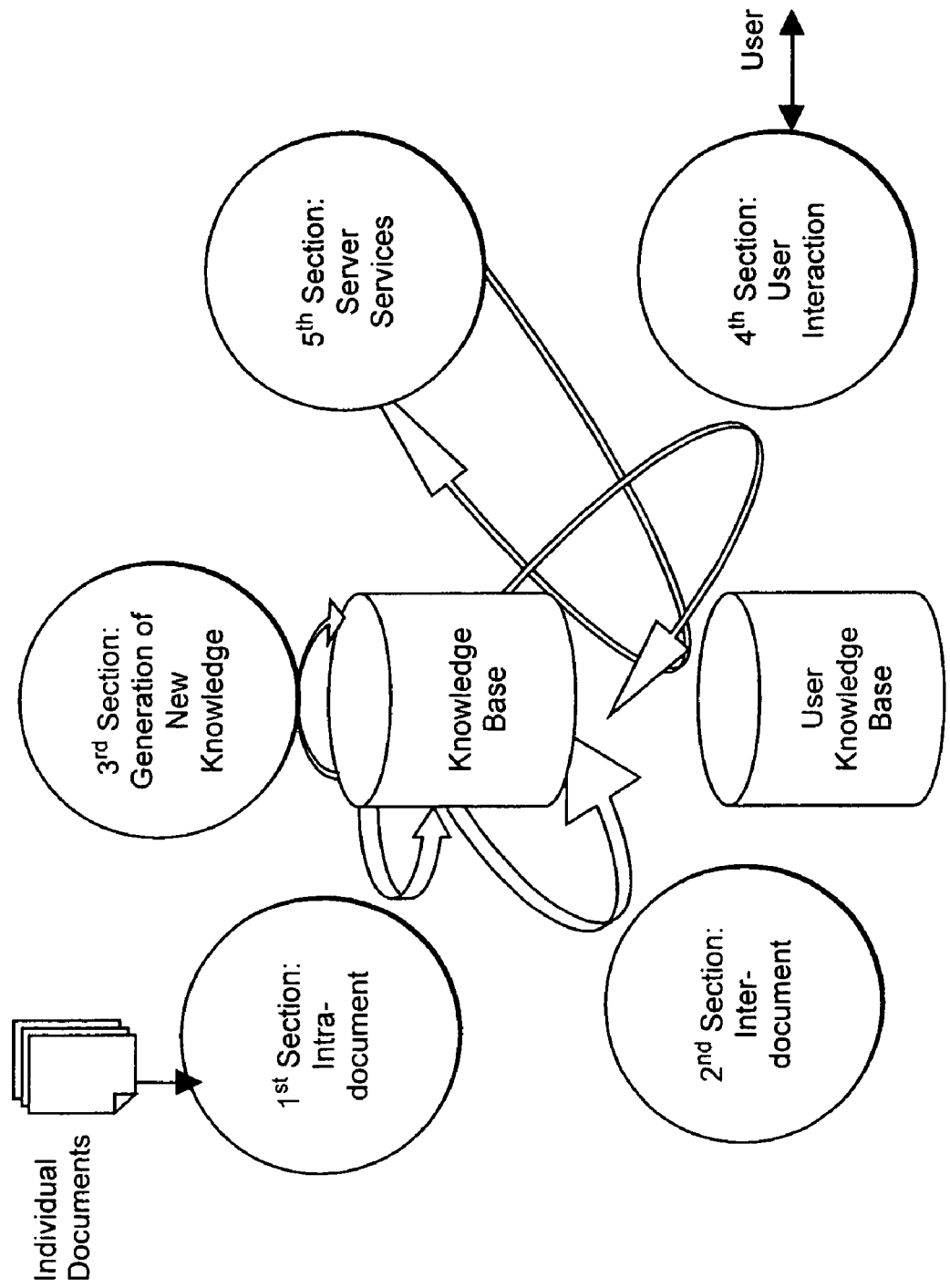

An overview of the system showing the different concepts of the invention as described above is shown in FIG. 1. It shows the generation of the knowledge base in the center in communicating relationship between the different major modules (also referred to as sections) of the invention. The individual documents are fed into Section 1 which performs intra document analysis. Section 2 performs the inter document analysis. Section 3 generates new knowledge, and Section 4 performs user interaction. Section 5 performs server services.

In one aspect, the invention provides a method that includes the steps of (1) performing concept recognition of documents, by exploiting the logical and semantic structure inherent in information communication, (2) generating conceptual graphs, (3) iteratively testing groups of concepts or sub-concept as possible conceptual centers of semantic relevance, (4) determining which terms are more central and which are more peripheral, and (5) creating the appropriate conceptual relations given the information structure and the semantic relevance. In the case of Standard English documents, for example, the information structure is that of the sentences, paragraphs, and word positions. The above-noted graph is based not only on proximity but also takes advantage of the inherent information communication structure of the document. In Standard English documents, for example, the graphs are affected by the structure of sentences.

Figure 13:
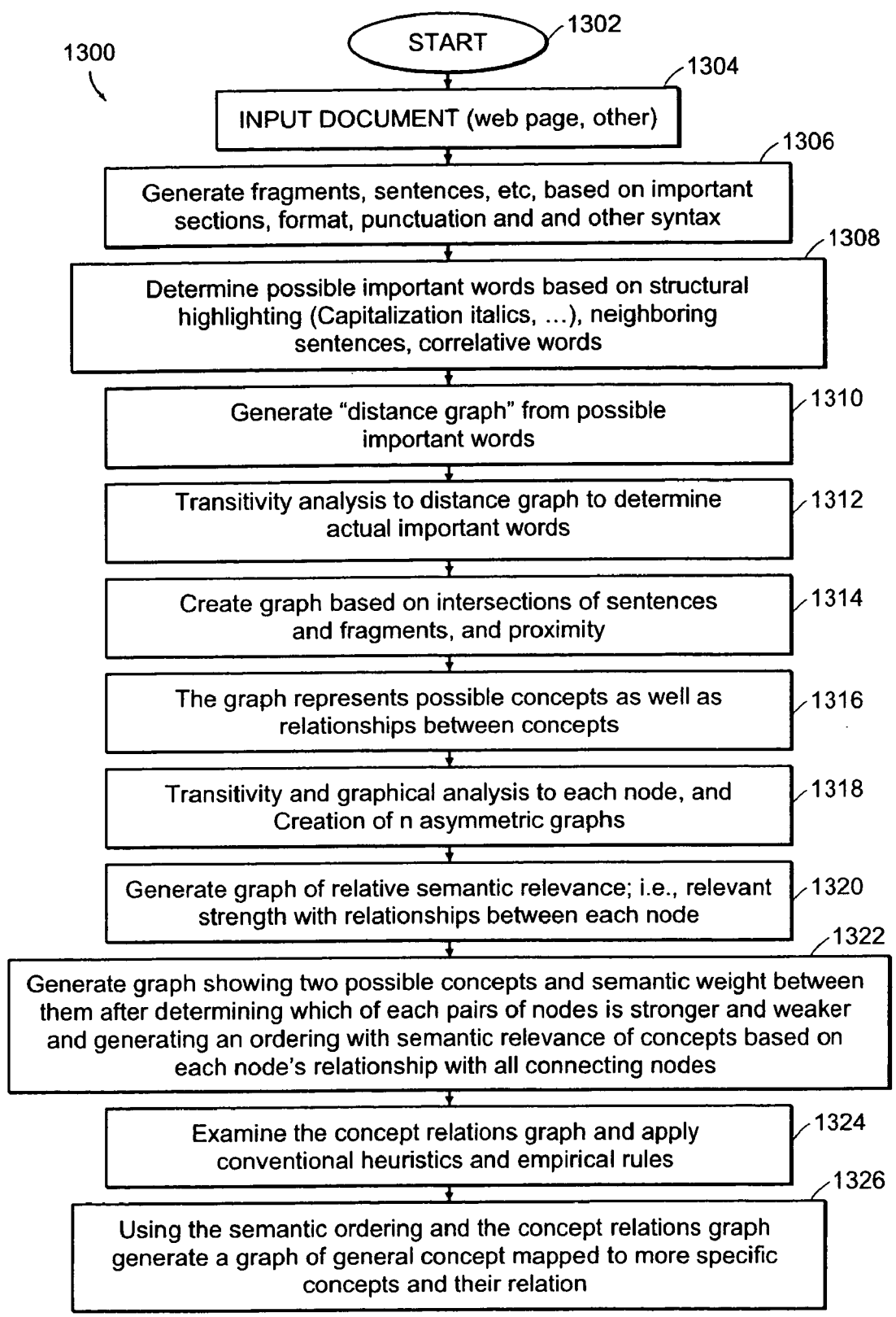
FIG. 13 is a flowchart depicting a concept's semantic relevance and associated relationships.

(a) Semantic Relevance Filter:

The invention utilizes a "semantic relevance filter" (as shown in FIG. 13) that exploits the information structure inherent in documents, including symbol (word) position, the observation that proximate symbols are probably related, the significance of highlighted symbols (in romance languages capitalization serves as a method of highlighting), and the observation that symbols that appear in consecutive groupings (in the case of natural languages sentences are the base set of groupings) are also "important words" that provide semantic connectivity. Accordingly, the system compares sentence patterns, including groups of symbols that may be the same between sentences. The system then examines the intersections and relationships between symbols to create a "conceptual graph" showing that some terms (grouped symbols/concepts) are very closely linked, and others less so. The system then tests each such term as a possible "center of semantic relevance", determining which terms are more central and which are more peripheral. This process is iterated for each term. The result is a semantic relevance relationship that defines the relative semantic relevance between concepts in the document.

(b) Normalization: Further, since it is useful to compare such relevancies not only within a document but also between documents, the semantic relevance is normalized [0,1]. It should be noted, however, that the "topmost" concept may not always have a score of 1, depending upon how many conceptual relationships have been determined, given the total number of actual concepts. In particular, while a document may contain many concepts, if it does not have many relations between those concepts it may not contain much knowledge. Knowledge is not just a set of concepts (facts); instead, it also how such concepts (facts) are related to each other.

(c) Graphical Analysis

The system then determines a set of directed conceptual relations from the conceptual graph. It places the relationships within the context of the information structure of the document and obtains a subset of the relationships. These relationships are the basis for the semantic knowledge web. The system then uses the previously obtained semantic ordering to determine the semantic direction of the relations, from general to specific. In other words, if a relationship exists between two concepts, the system uses their semantic relevance to determine which of the two is more general and which is more specific. In addition to semantic relevance, other heuristics can also be used to determine the semantic ordering of the relationship; and the context of a concept relationship also can be utilized. This can be determined by examining how the set of concept relationships relate to each other to create a 3-tuple that has the form (context, concept, sub-concept).

(d) Summary Generation

In another aspect, the invention provides methods and systems that automatically construct summaries of documents of varying length and conceptual orientation. A summary can be conceptually targeted to favor or disfavor a particular concept, or set of concepts, or to favor or disfavor particular semantic relationships between sets of concepts. The system creates a summary of the document, using sentences and/or sentence fragments from the document. Sentences can be ranked according to "core ideas" they contain, the relationships that they express, and are then scored using the information generated. This gives context to the summary. Although prior art methods use a sentence weighting measure to determine summaries, typically they were unable to determine whether a sentence actually made a significant conceptual relation to a given document. Also, such systems are unable to create variable length summaries in such a way that smaller summaries are more conceptually compact. It will be seen that short summaries, generated by prior art systems, that compare two documents that only differ by just a few sentences from each other, are actually the same. The summaries created by the present invention can selectively favor or disfavor certain concepts and conceptual relations, as the user specifies.

In the discussion set forth hereinafter, for purposes of explanation, specific details are provided in order to enable a thorough understanding of the invention. It will be appreciated by those skilled in the art that the present invention may be practiced without these specific details. In particular, those skilled in the art will appreciate that the methods described herein can be implemented in devices, systems and software other than those shown, and the examples set forth herein are provided by way of illustration rather than limitation. In other instances, conventional or otherwise well-known structures and devices are shown in block diagram form in order to facilitate description of the present invention.

(e) N ise reduction: In still another aspect, the system utilizes techniques to remove "noise" from a given document by an analysis of the structure of a document (as in FIG. 2). This is especially useful in the context of the web, where an article is usually presented with a large amount of unrelated information (i.e., "noise"). The system accomplishes this by leveraging the grouping (usually some table structure), determining the local hierarchy of such, determining how the information is distributed through this structure, and then deciding what part of the document is actually attempting to convey information. This can be enhanced by an original pass of the "semantic relevance filter" to understand the semantically relevant concepts, and then to see how they are distributed through the local hierarchy of the document structure.

(f) Topological analysis: Another aspect of the invention provides strategies for understanding the semantic relevance of a concept to a particular document, as well as understanding the semantic relationships between concepts, where "topological information" is available. Topological information links two or more documents together in some fashion. Topological information can be links on the worldwide web, or can be the to/from information in email. The topology is directed, since there is an originator of a link and the receiver of a link.

In most cases the topological information can be viewed as a tree with possibly more than one root. The system advantageously utilizes the observation that most multipart information communication is done in a hierarchical manner. In the case of the Worldwide web, the system exploits the links between information (documents) and the fact that (1) websites are generally hierarchical, and (2) the sub-class imparts knowledge about the super-class (i.e., the "children" provide information about the "parent"). In the typical case, the user seeks the specific, not the general. Thus, one aspect of the invention utilizes an "inverted filter" method (see FIGS. 8 and 9). This takes the semantic relevance of a concept in a child document and modifies the semantic relevance of a concept in the parent document, thereby utilizing the directionality of the topology (local hierarchical structure) as well the understanding that the referencee/child (sub-class) imparts a context and understanding of the referencer/parent (super-class).

Thus, the system generally converts information from a flat data structure to a "graph structure", and isolates the "noise" from the "signal", to enable noise removal and illuminate the semantic relationships in the signal.

(g) Iterative process: The process described herein is an iterative process of scanning and knowledge generation, including document categorization, noise removal, the use of information already contained in documents, and, in some cases, an inverted filter. This iterative process actually improves in accuracy and performance as more information is placed in the database.

The system described herein can be applied to a website(s), an individual's or group's email, intranets, and other collections of documents. Thus, the system processes the documents in the website, learning concepts and conceptual relations. The system can also exploit the topological information of the website (i.e., internal links in the website).

(h) Adaptive directories: The system also enables the construction of adaptive directories that utilize the general/specific conceptual relational information. These structures are quite unlike conventional structures (e.g., Yahoo!), and instead are auto-generated, based upon available information. This enables directories for sets of concepts to be generated for any conceptual depth and for any set of relations. Thus, directories for various sets of concepts can be automatically created.

Thus, the system provides automatically generated synopses, semantic relevance, concept relationships, and a context-based directory. The system can be configured to apply itself to a document or website over and over again, to generate further refined results.

(i) Collection Intelligence: The system also enables the amalgamation of the semantic web and documents to generate new knowledge and information. Examples of new knowledge are comparative concept relevance analysis with respect to time, sources, and other identifying criteria that might be of interest. The ability to determine relevance allows for the determination of semantic focus with respect to such parameters and for the determination of conceptual trends. Also the system is able to determine conceptual maps of the collection or subsets there of. This can then be combined via the comparative analysis to understand difference and similarities in collections and well as trends.

The invention can be divided conceptually into five major subsections. The first deals with the analysis of individual documents. The second deals with the analysis of collections of documents and additional topological information. The third deals with leveraging the concept semantic knowledge base to generate new knowledge. The fourth deals with user interfaces, adaptive directories, and document search results. The fifth deals with leveraging both the user and semantic knowledge base to provide server oriented services such as improved web caching, apply conceptual/behavioral user models in targeted advertising and more personalized content generation.

(ii) Section 1: Intra-Document Analysis

Figure 2:
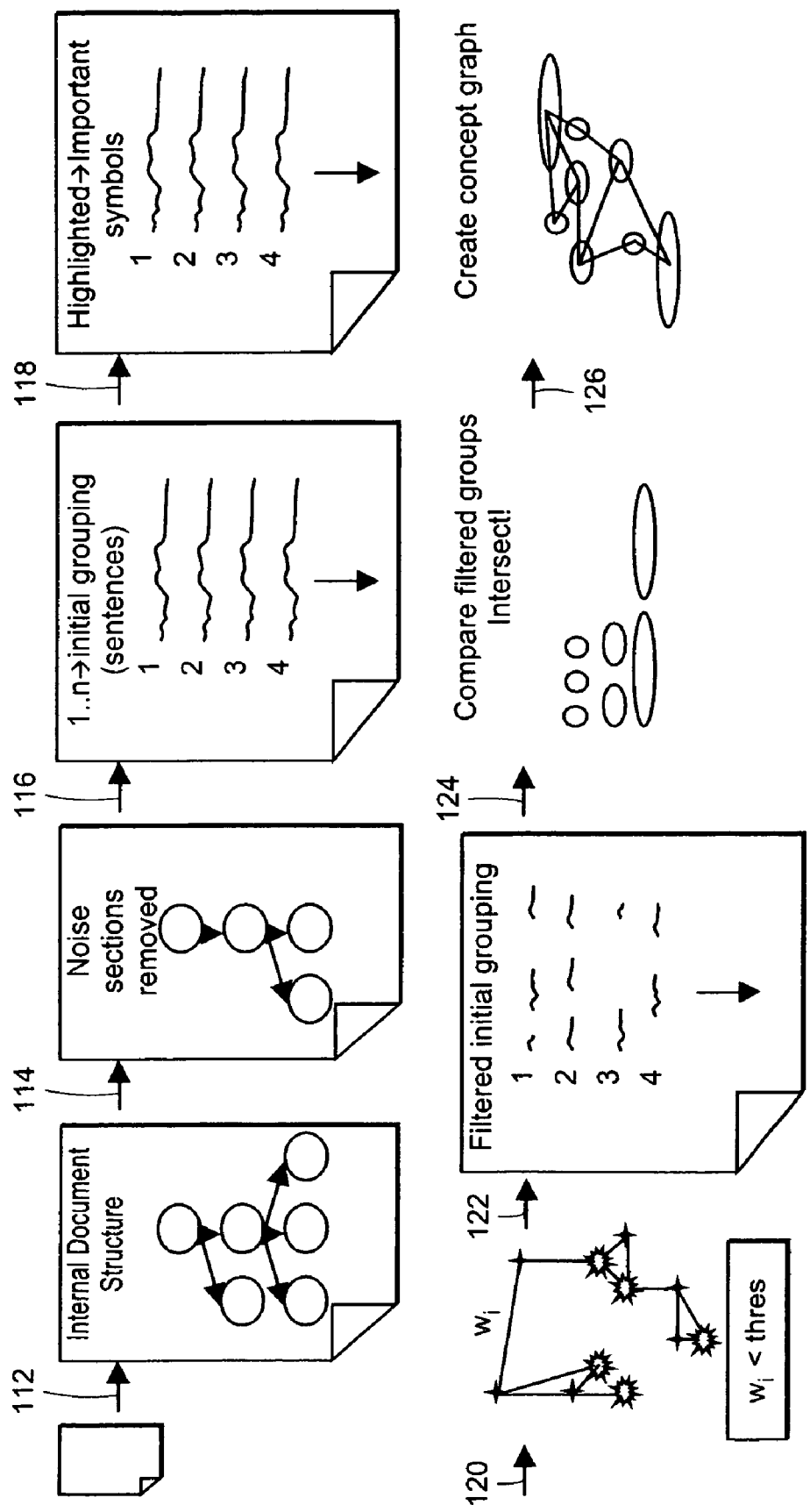

As shown in the reference FIGS. 2-7, 13-14, in the following discussion, the first section analyzes documents and determines concepts, the semantic relevance of the concept to the document, and conceptual relationships. FIG. 2 is a pictorial overview of Intra-Document analysis. First, noise is removed by looking at the local hierarchical structure of the document to determine which part of the document contains the "focus" of the document. (112,114) The "important section" of the document is then obtained. Next, the different symbols that constitute the subsequent document are determined. Next, the information structure of the document is used to determine groupings of symbols. For Standard English documents, this would constitute determining the sentences. (116) Also, the important symbols are determined. For Standard English, this constitutes highlighted symbols (words) such as capitalization, as well as symbols that appear in consecutive sentences, as they are semantically connective.

(118) The system then determines the proximity of the symbols that constitute the document to determine additional important symbols. (120). After the "important" symbols have been determined, the initial grouping determined by the information structure is filtered so as to only contain the symbols that are "important". (122)

The system then determines the proximity of the symbols to each other. To determine the sets or groups of symbols (concepts) that should be considered, the initial groupings are intersected against each other to determine which sub-groupings of symbols (likely concepts) to use as concepts. The symbols which are not part of above sub-groupings are then placed in the context of the initial groupings, and the distribution of the omitted symbols is taken into account, as are the "already-likely" concepts, to determine the remainder of the concepts (sub-groupings of symbols) to be considered. At this point we have the set of concepts that are of import to the given document. (124).

These sets of concepts are then placed in the context of the original groupings. Also, the similarities of symbols that constitute the concepts are taken into account. Both of these are used to determine a graph that represents the associations between the concepts. (126) This graph is then analyzed to determine the semantic relevance of a concept for the document. This is done in the following manner, with reference to FIG. 2.

Thus, the system generally converts information from a flat data structure to a "graph structure", and isolates the "noise" from the "signal", to enable noise removal and illuminate the semantic relationships in the signal. Thus, the process described herein is an iterative process of scanning and knowledge generation, including document categorization, noise removal, the use of information already contained in documents, and, in some cases, an inverted filter. This iterative process actually improves in accuracy and performance as more information is placed in the database.

Figure 3:
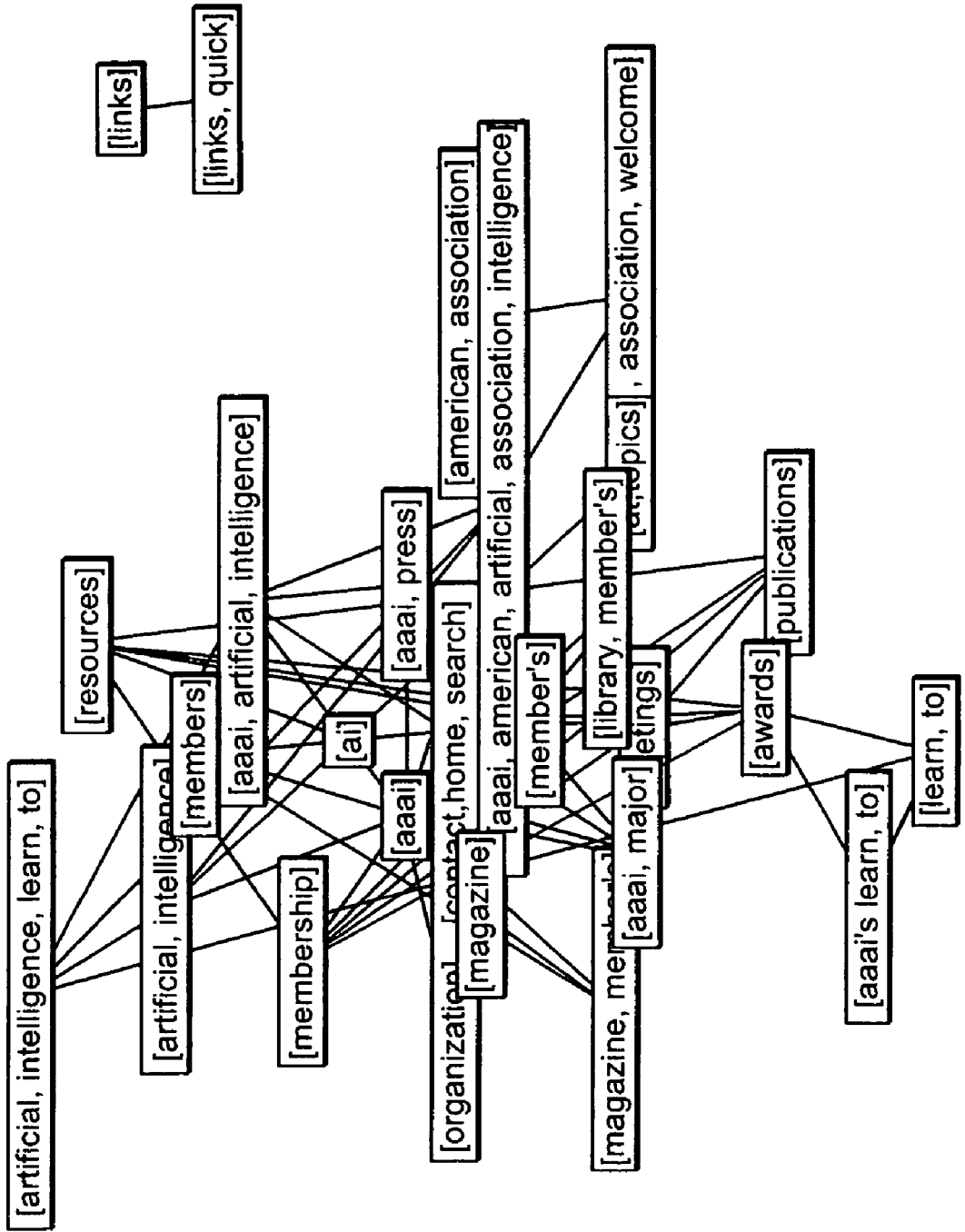
FIG. 3 shows an example of a graph of initial concept relations taken from http://www.aaai.org/.

FIG. 3 shows an example of a graph of initial concept relations taken from http://www.aaai.org/. In it, we can see that concepts such as "artificial intelligence" have been connected to "ai", "aaai", and "american association", each of which makes sense given the context of the page.

Figure 4:
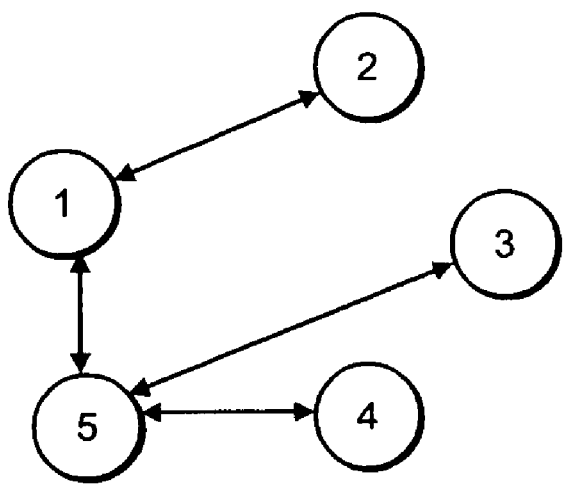
FIG. 4 is an example graph with 5 nodes.

FIG. 4 shows a sample initial graph. A node in the graph represents each concept. Each node has a weight that represents the strength of the relationship between concepts. The purpose of the process is to create asymmetric relationships where there originally was a symmetric relationship. Then all the shortest pairs paths are computed.

Figure 5:
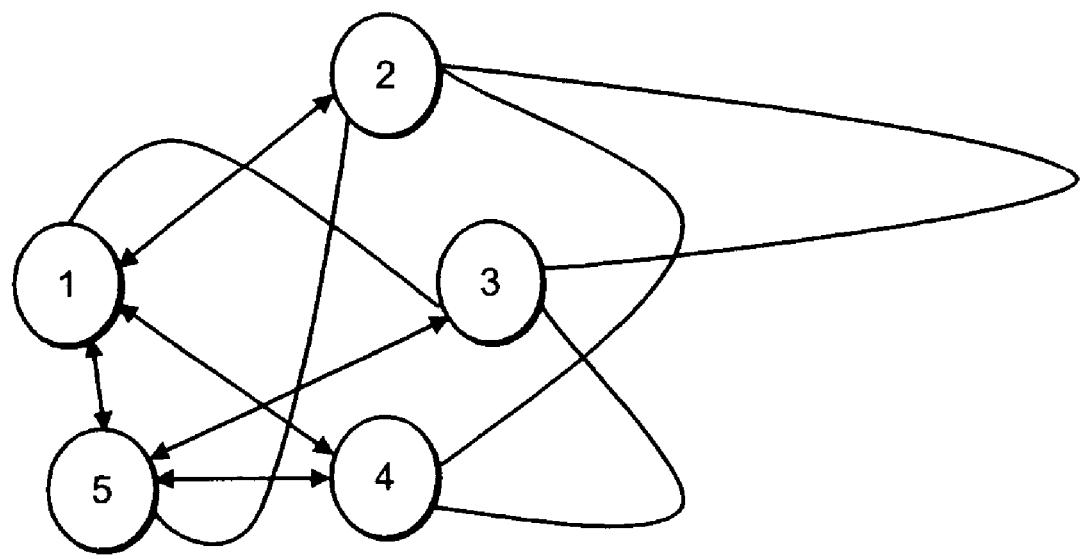
FIG. 5 shows the shorted pairs path applied to graph in FIG. 4.

FIG. 5 shows the computation of the shortest pairs paths between the nodes. Each node, Ni, in turn is then considered to be a center of a reverse gravity field that pushes other nodes, O1 ... Ok, away more, the farther they are. It also takes into account how many nodes, O1 ... Oj, were closer to the node Ni. At this point the graph is most likely asymmetric. Next, each node, Ni, is compared via a ratio of its distance to all the other nodes to which it connects. The semantic score for a node Ni is the sum of the ratios greater than 1 minus the sum of the inverse ratios that are less than one.

Figure 6:
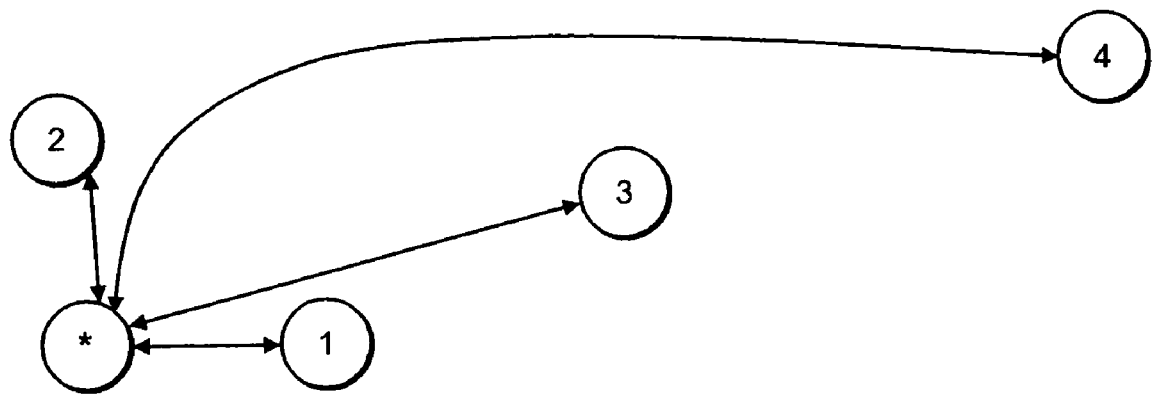
FIG. 6 is an example where bottom left is center among the nodes.
Figure 7:
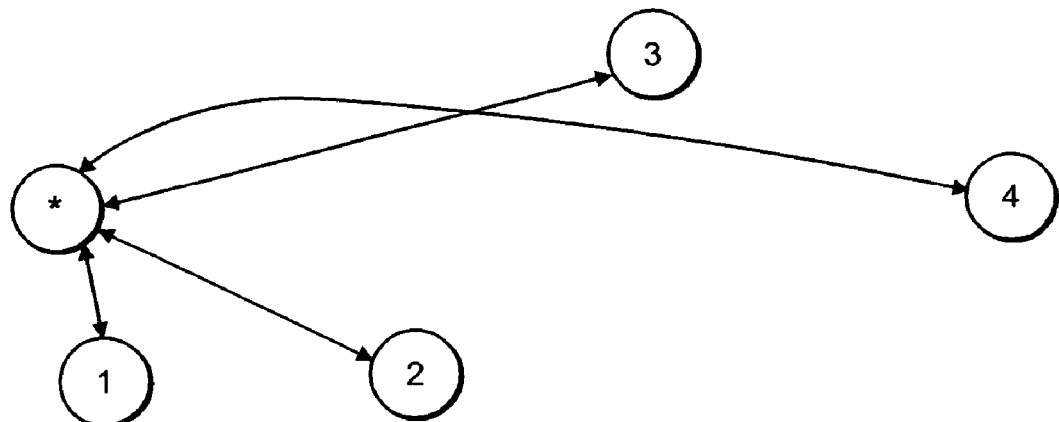
FIG. 7 is an example where top left is center among the nodes.

FIGS. 6 and 7 depict centers. FIG. 6 is an example where bottom left is center among the nodes. In FIG. 6, Labels 1 to 4 as shown represent the node ordering as to their distance away from node (*). FIG. 7 is an example where top left is center among the nodes. In FIG. 7, labels 1 to 4 represent the node ordering as to their distance away from node (*). Let the length of the connection represent the relative weights of the connections. Smaller weights donate closer relationships between nodes. Iterate through each node (O1 ... Ok) and obtain the k different graph resulting from the reverse gravity field. Let (*) donate the present center. Let (1,2, ... k-1) donate the ordering of the vertices in terms of distance ordering.

Similarly for other centers, different graphs are generated. Let Dij be the distance from i to j where i is the center. From this we then calculate the semantic score for the ith node by summing the ratio of Dij/Dji where $j \in (1 \ldots k)$ & $i \neq j$. If the ratio is greater than 1 we add the value to the ith semantic score, and if the ratio is less then one then we subtract the inverse ratio from the ith semantic score. The following result is the semantic score. (132) After obtaining the semantic score we then normalize by adding the minimum score plus a small amount to each score.

Referring again to FIGS. 4 to 7, the system then reviews the concept relationships in the context of the initial groupings and new information generated. Depending on the new information a subset of the relationships is kept. They are then ordered by using the order of the semantic relevance to create directional relationships. These relationships represent a relation between a more general concept and a more specific concept.

Using this information, the system then examines the importance of each initial grouping (in the case of Standard English these are sentences/fragments) with respect to the semantic relevance of the concepts that they contain as well as the relationships that they define. This is used to rank the initial groupings in order of semantic significance to the meaning of the document. Favoring or disfavoring certain concepts and conceptual relations can modify these scores. Also a multilevel semantic flow analysis is done. Each sentence is ascribed a semantic continuity (semantic derivative) as to how related this sentence is to the sentences after it within a given threshold. This then forms a single level semantic flow. This process allows for the subdivision of the sentences into sets of sentences where there occurs a semantic discontinuity. The same process can be repeated to generate a multilevel semantic flow. This then allows the system to determine where to place breaks as well as an additional metric as to what sentences to choose. These n groupings are then reordered to their initial ordering. Depending on the desired length of summary, the system can then choose the top n most relevant groupings. This results in a summary of varied length that is a conceptual distillation of the original document.

Also using the information, the system is able to determine a unique score, a "concept hash", representing the document based on the concepts and their semantic relevance. This unique value can be used to determine if two pages contain the same semantic information. Thus documents that might differ in some groupings or may originally contain different extraneous information will be determined to contain the same semantic information if their uniqueness scores are within $\epsilon$ units of each other. This allows the system to determine if it has already analyzed a document. This is especially useful in the context of the web and dynamic websites where it is very difficult to determine if two web pages are superficially different. This may, for example, enable evaluation of exactly how much unique content exists on the World Wide Web, as opposed to the number of documents that are available on the web but are semantically equivalent.

The system then takes all this information and interns it into the knowledge base. The semantic relevance of the concepts to documents is then recorded. The conceptual relationships are compared to previous information and the semantic knowledge web is then expanded. The summaries and concept hash are then recorded along with other information.

(iii) Section 2: Inter-Document Analysis

As shown in the reference figures, (FIGS. 8-9, 15-16), in the following discussion, the second section analyses inter-document relationships, and utilizes topological information and conceptual relationships to more accurately determine the semantic relevance of a concept to a document. Two main processes are employed. One is an "inverted filter" (see FIGS. 8 and 9) and the other is a method to determine a categorization of a set of documents (See FIG. FIG. 16).

(a) Inverted filter: The "inverted filter" process utilizes the topology of a set of documents to more accurately represent the semantic relevance of a concept to a document. Topological information is information that links two or more documents together in some fashion. Topological information can be links on the worldwide web, or the to/from information in email. Topology is directed, since there is an originator of a link and the receiver of a link.

In most cases the topological information can be viewed as a tree with possibly more than one root. The system advantageously utilizes the observation that most multipart information communication is done in a hierarchical manner. In the case of the Worldwide web, the system exploits the links between information (documents) and the fact that (1) websites are generally hierarchical, and (2) the sub-class imparts knowledge about the super-class (i.e., the "children" provide information about the "parent"). In the typical case, the user seeks the specific, not the general. Thus, one aspect of the invention utilizes an "inverted filter" method. This takes the semantic relevance of a concept in a child document and modifies the semantic relevance of a concept in the parent document, thereby utilizing the directionality of the topology (local hierarchical structure) as well the understanding that the referencee/child (sub-class) imparts a context and understanding of the referencer/parent (super-class).

In most cases the topological information can be viewed as a tree with possibly more than one root. The system leverages the observation that most multipart information communication is executed in a hierarchical manner. In the case of the worldwide web, the system leverages the links between information (documents) and the observation that (1) websites are generally hierarchical, and (2) the sub-class imparts knowledge about the super-class (i.e., the children provide information about the parent).

Thus, the "inverted filter" exploits this inter-document hierarchy. The "inverted filter" allows the concepts at the lower levels of the hierarchy to "trickle up", thus increasing the semantic relevance of the concept in the higher levels. The following example illustrates this.

Figure 8:
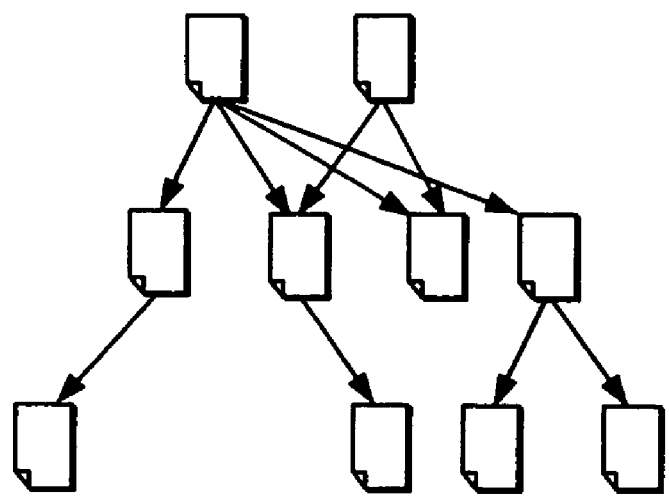
FIG. 8 depicts the hierarchical topology as occurring in websites, magazines etc.

FIG. 8 depicts the hierarchical topology that occurs in websites, magazines, books, and even email. Let the topology be considered a tree with r root nodes with a depth of h. Let a node at a depth level i be donated as Nix where x ranges from 1 to k, which is the number of nodes at depth i. Let Parent(N n) be a function which return the parents of a given node.

Thus, we "invert" the tree and allow the concepts to "trickle down" by adding a decreasing percentage of their semantic relevance score to the same or possible related concepts lower on the "inverted" tree. (220) This practice is based upon the observation that the sub-class/child imparts knowledge about the super-class/parent. This allows for the general concepts to be most heavily weighted on the most general pages, thus enabling a better understanding of the semantic relevance of a concept for a document, given the "context" of the document. In this case, the "context" is superset of its topological children.

Figure 9:
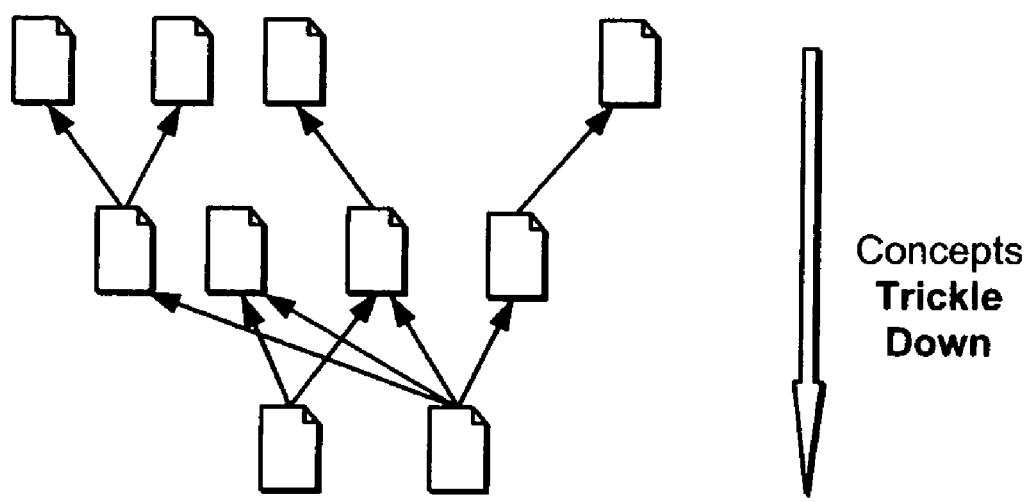
FIG. 9 illustrates an inverted filter depicting trickling down of links to modify semantic score of related concepts.

FIG. 9 illustrates an inverted filter representing the concepts trickling down the links to modify the semantic scores of the concepts or related concepts in the parent documents.

(b) Document Categorization: To categorize a set of documents, the system first determines which concepts and conceptual relations are relevant to the set of documents. It does this by reviewing each document's concepts and conceptual relations in the context of all the documents, and determining how the documents are related, both on a per-concept level and on a "conceptually relational" level. The system does this by finding what concepts connect the documents together, the total concept graph, and what relations are made in more than one document.

The system then takes advantage of the concept graph (semantic knowledge web), whose relationships also contain a direction, to help in determining which of the concepts are best for categorizing an individual document for each document in the set. It obtains the semantic score of the concepts given the graph of concept relationships as in Intra Document Analysis (Section 1). Then the concepts with the highest semantic scores are chosen as the "groupers" or categories for the given document set. If the resultant number of concept "groupers" is more than can be readily processed, the process can be reiterated with the set of "groupers" to obtain a smaller set.

This then results into a conceptual directory system for the set of documents. It does this because once a concept of the visible directory is chosen; a subset of the documents is then retrieved, categorized, and then the process can be repeated.

(iv) Section 3: Creating New Knowledge from Previously Generated Knowledge

As shown in the reference figures (FIGS. 17,18), in the following discussion, Section 3 deals with the generation of new knowledge from the knowledge base. This consists of generating a general hierarchy for each collection as well as super collection (the combination of all collections), learning which concepts are similar in general. To determine the general concept map (general hierarchy) for a collection the system first determines which concepts are possible general categories. It does this by examining how many connections each concept has in the general position as well as how many times a concept is in the general position. Thus in the end for each concept we have 1. Concept C
2. Number of unique relations when C is in general position
3. Number of times C is in general position These values are subject to which collection we are creating a general concept map for. The system then determines the subset of possible categories by removing those that are either to ubiquitous to categories any section of the collection or those that are too limited to be a category for a decent percentage of the collection. Of the remaining concepts, the related concept graph is obtained by requesting the associated collection concepts relationships. Then as in Section 1 the semantic relevance of each concept is determined. As stated above in Document Categorization, the top semantic ranked concepts are chosen as the categories. The adaptive directory (described below) with respect to the collection in question is then created for each of the chosen categories. Then for each category, its subcategories are analyzed to see percentage of disjointness (number of actual relations between the concepts/max number of relations). If the percentage of disjoint subcategories is above a threshold such as 40% the possible category is not a good representative category as is subsequently discarded. The top level categories are then the categories that remain.

Some concepts are only similar under particular contexts; however, others are similar regardless as to context. To determine such similarity the system does the following. First a subset, K, of all concepts must be chosen. The system must have enough information regarding its relationships to have any validity as to similar concepts. The system does this by generating an adaptive directory (described below for the concept in question. If the top ranked score of the adaptive directory has a score of above some threshold and the disjointness of the subcategories is above 40%, then the concept in question should be considered to possible highly similar concepts. For each concept C in K, possible similar concepts, $C_{si}$ also in K, are similarly associated to the concepts that are strongly associated both in the general and specific positions as C is. The concept graph, CG, representing the associated concepts for C in either position in obtained by querying the knowledge base. The concepts, $C_{si}$, and the associated relationships are removed from CG. The semantic score for C is determined as in Intra Document Analysis (Section1) in the concept graph CG. Then for each, $C_{si}$, C is removed from CG and $C_{si}$ and its relationships are added and semantic score is obtained for $C_{si}$. If the semantic score for $C_{si}$ is with a threshold to the score for C, then $C_{si}$ is considered to be generally similar to C. When determining when two concepts are similar given a particular context T, K is intersected with the set of concepts that are in the specific position when T is in the general position.

(v) Section 4: Creati n f a User- riented Kn wledge Base

As shown in the reference figures, FIG. 12, FIGS. 19-27, in the following discussion, Section 4 deals with leveraging the knowledge base that has been generated to 1. improve user interfaces by providing a better substrate;
2. provide better search results;
3. help the user by providing "adaptive directories";
4. understand natural language querying;
5. enable the user to file away documents and have the collection of documents automatically organized in coherent manner;
6. allow users to be able to share sets of collected documents based on conceptual interests and rules;
7. increase the understanding of the system of a particular user;
8. enable the system to be able group users, thereby automatically creating communities of people with actually similar interest in a passive manner;
9. enable the system to build a conceptual model of users (humans) and leverage such knowledge for better conceptually targeted advertising, web log analysis, and the like.

(a) User Interfaces: To be able to create more intelligence application and user interfaces, a better model of the user as well as better methods of translating between humans and machines are required. The semantic knowledge base offers the ability of creating intelligent interfaces by enabling the translation of human desired to machine understandable instructions and for machine output to be presented in a human understandable way. The system does this by associating concepts with pieces executable code that can be linked together in a generic manner thereby allowing for a sequence of concepts to express a complex request to be executed. The system can also determine if a concept is not able to be bound to either a piece of code or data and can then query the user as to further specification.

(b) Searching: To improve the search results for a user, the system first determines the concepts and the associated semantic ordering the user requested. In other words, the system is able to understand that:

Graphics>Computers≠Computers>Graphics

The ability of the system to understand the difference allows the user to go beyond the standard Boolean logic of conventional search utilities, and dramatically improves the ability of natural language querying tools.

The system allows the user to specify what concepts are of interest and the context in which the user wants these concepts. The system then leverages this semantic ordering; if present, to provide results that match the semantic ordering given. Documents which match not only the concepts but the semantic ordering are given preference, compared to those that might contain the concepts but do not match the desired concept ordering. The system is able to leverage its understanding of semantic relevance of the concepts and is able determine a metric by which both the relevance as well as semantic ordering are taken into account to provide vastly improved search results. Additionally, the system can leverage its ability to understand similar concepts in a context (described below) to be able to automatically expand the search parameters while still guaranteeing relevant results.

(c) Adaptive Directories: When dealing with unfamiliar topics and large corpuses of information it is advantageous to have a system that provides context dependent directories at any level of specificity. The type of knowledge base generated through the above means enables the system to create such directories given an initial set of concepts. These directories seek to give both different possible contexts that the initial concept(s) could be under as well as show the different more specific branches available. Also the directories describe the space of the concepts that relate the concepts given if there is more than one.

Figure 12A:
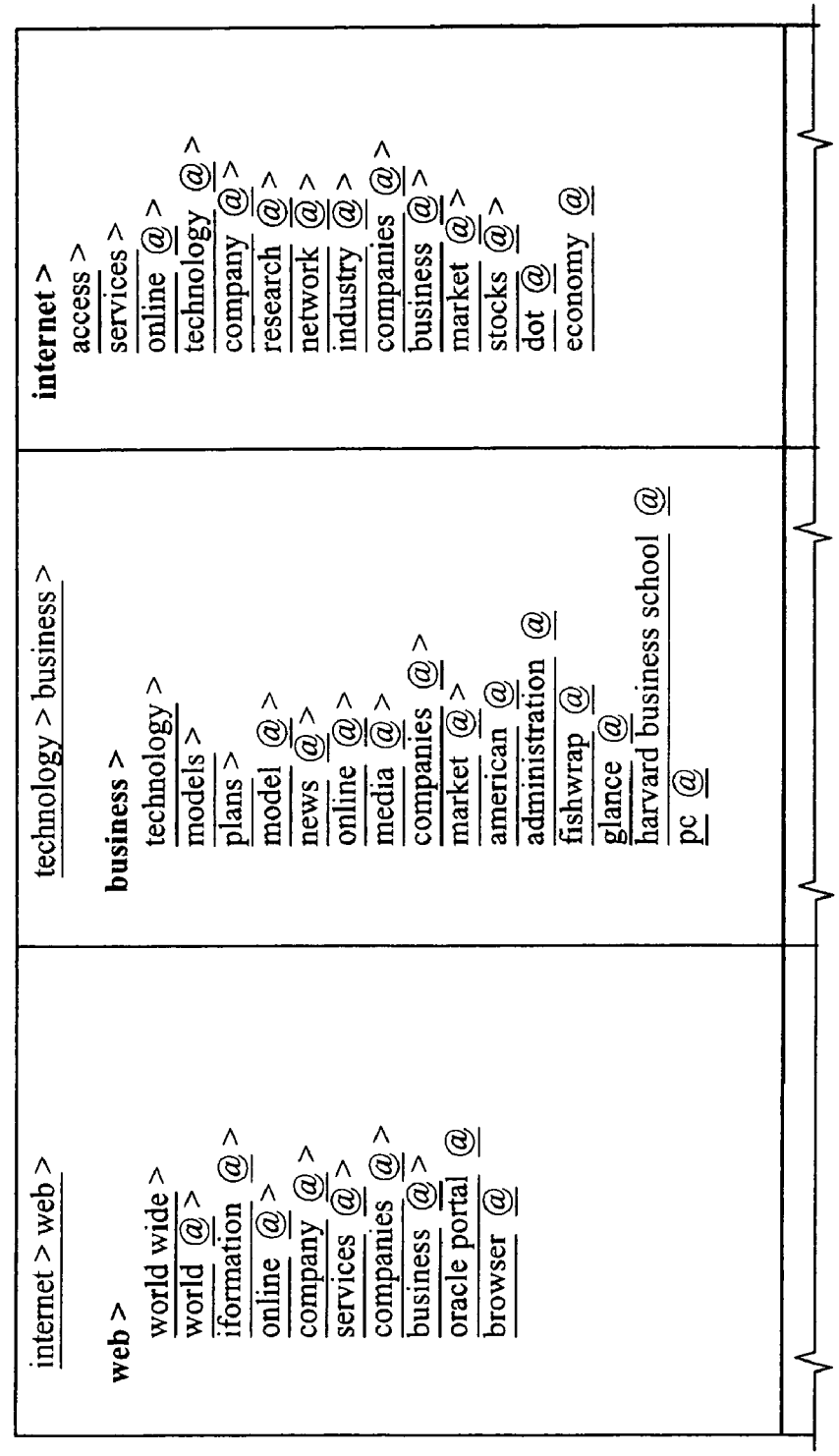
FIG. 12A-12C is a set of examples of an adaptive directory.
Figure 12B:
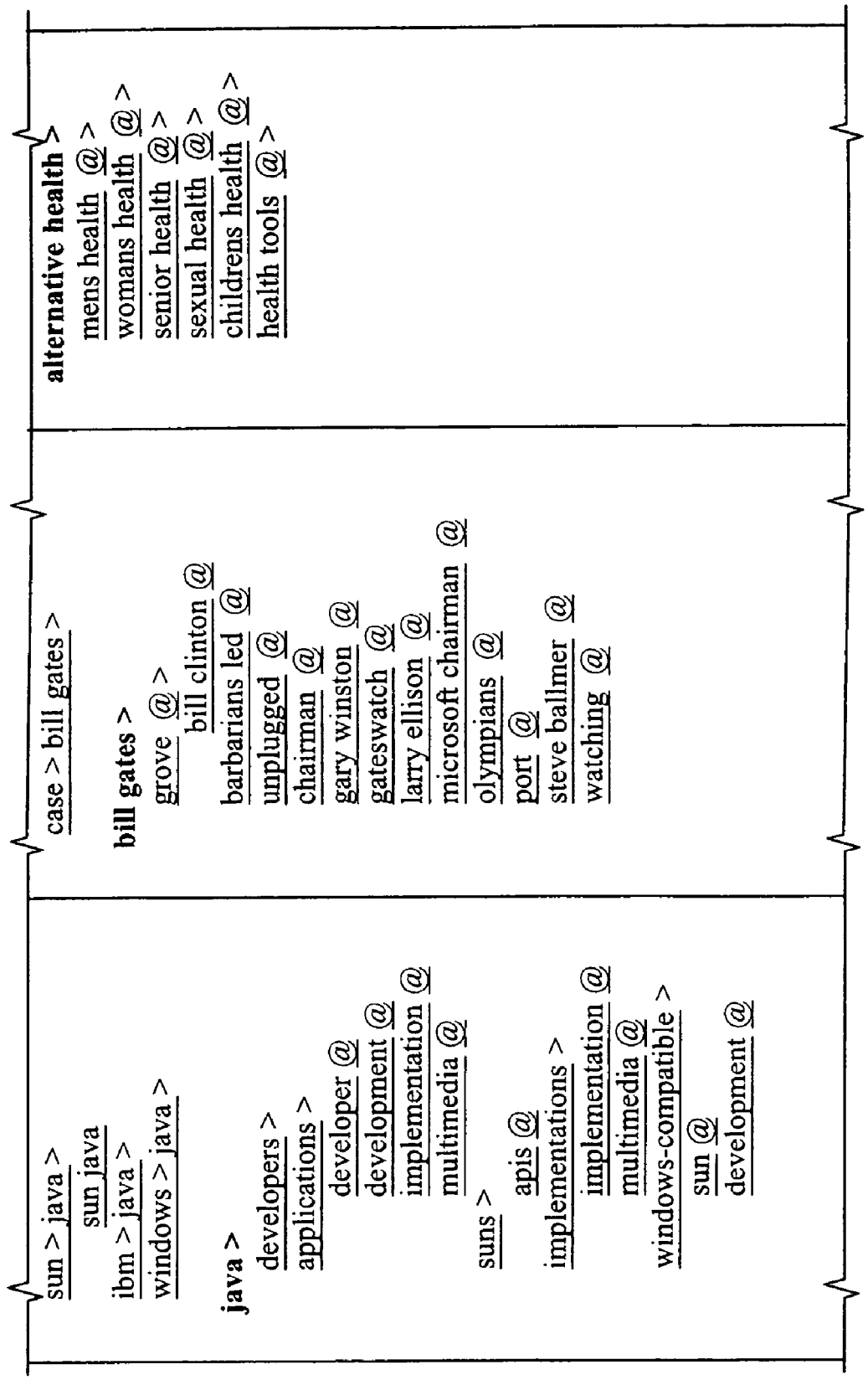
Figure 12C:
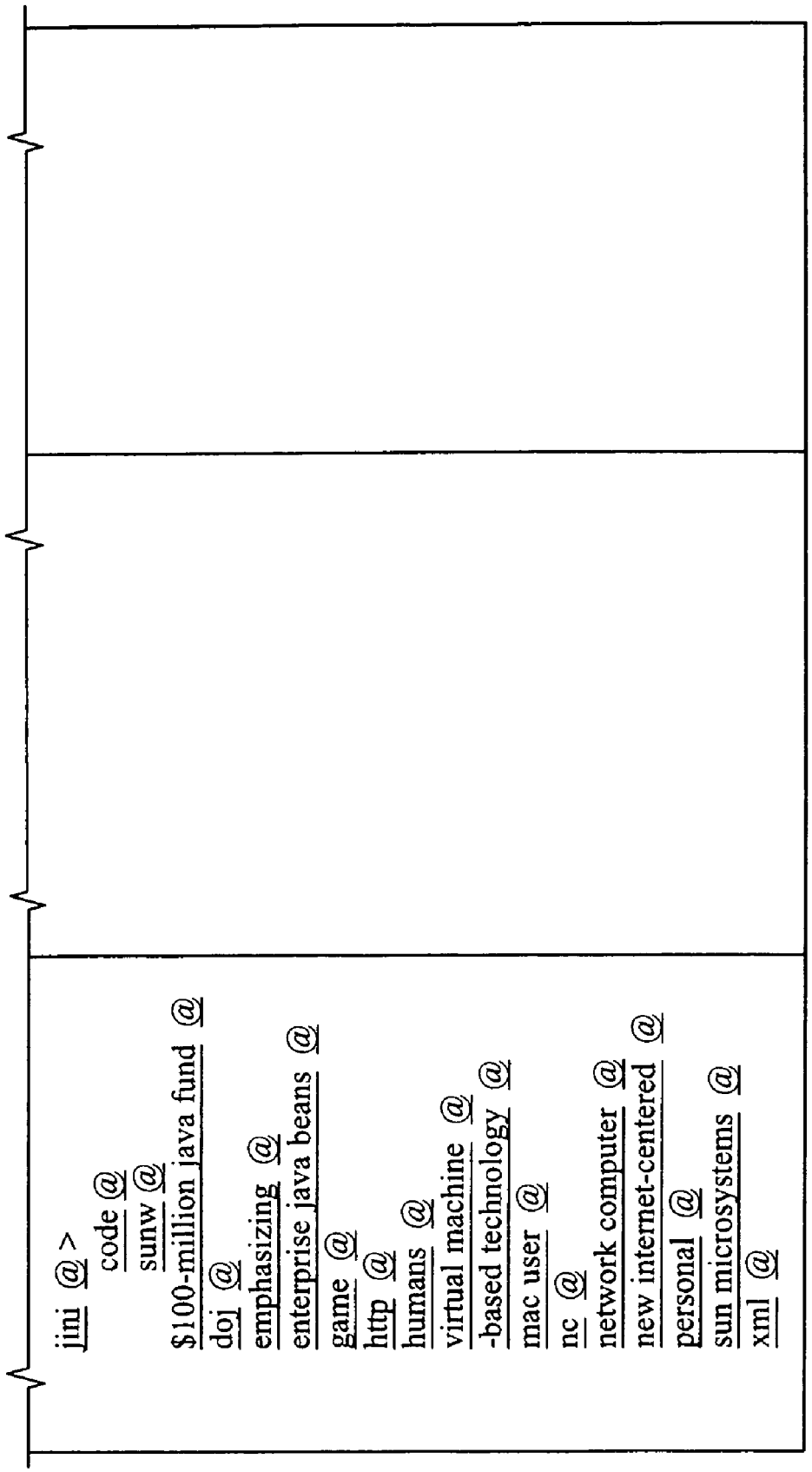

Given a set of concepts, the system queries the knowledge base for which concepts are related both more generally and more specifically. If there is more than one concept it looks for concepts that relate to both of the concepts. It then takes these concepts and determines the relationships between each pair. Using this information it is able to determine which concepts group/partition the set of associated concepts the best. Also, it is able to determine possible contexts for the initial set of concepts given. Once the associated concepts have been determined the relationships between these concepts are obtained from the knowledge base are obtained to determine the associated concept graph. Then as in document categorization and Intra Document Analysis (Section 1), the semantic score for each concept is determined. The top semantically ranked concepts are chosen as the adaptive directories "subgroupers" or "subcategories". The concepts that were more general than the requested concepts are then analyzed as to their ability to act as a context for both the query concepts as well as the subcategories. Those concepts that are able to act as a category for both given simple constraints are then chosen as contexts for the adaptive directory. Also, those concepts that are very similar in their relationships as the query concepts to both the determined contexts as well as the subcategories can be then viewed as similar. Altogether, this results in an adaptive context dependent directory. With even limited amount of information (just a few thousand documents from sites such as redherring.com and upside.com the system is able to create adaptive directories for such things as business, internet, and the web to topics such as java, bill gates, and alternative health. It should be understood that the knowledge contained is entirely based on the documents the system has analyzed. In the future, the system might also leverage human generated knowledge bases. However, given larger numbers of documents the system is able to refine its knowledge both in breadth and depth. FIG. 12 is a set of examples of an adaptive directory.

(d) Natural Language Querying: NLQ has been considered the most desirable interface for searching. However, the majority of systems that NLQ, attempt to transfer a natural language query into a Boolean query, which people have difficulty in formulating themselves. This is the basis of such systems as Ask Jeeves. With a knowledge base that understands concepts and their relationships including which one is more general than the other, different types of queries such as hierarchical, relational, and other types of queries can be derived. Also, given more information and more concepts and their relations, the ability to disambiguate with the associated semantic network allows for more precious search queries to be generated that are a mixture of hierarchical, relational, and Boolean. The knowledge base will first identify the possible concepts. It will then look at the relationships specified in the query vs. the relationships it already knows and determine the type of query to execute. Thus given the natural language sentence(s) (NLSs) it will determine the k concepts and the possible relations between them. It will then be able to choose the most likely or even ask the user if multiple possible hierarchy, relational, and Boolean choices exist. Thus the request will more semantically match the desired users request and subsequently will generate more precise answers.

(e) Automated Filing (Individual and Group): The hierarchical file system as available right now on computers is not ideal. Most users want to be able to save a file and then later retrieve it quickly and painlessly. At present, users find it difficult to use the hierarchical tree file system and end up placing many files in one directory, which later complicates the retrieving process.

What is needed is an automated filing system where the user documents are automatically organized and can be easily retrieved either through an intuitive clicking system or by an intelligent search. By leveraging the document analysis and the knowledge base, the system can automatically create a conceptual directory structure that facilitates the navigation of the corpus. Also by leveraging the document analysis, the documents can be searched in a conceptual manner. The resulting documents, which may or may not contain the source concept, are then re-categorized to create an optimal conceptual directory.

This is especially useful when working in a group. Users can easily incorporate new works generated or found by co-workers into their corpus without having to spend large amounts of time organizing the information. Also the new information will be taken into account with the old, to create a personalized optimal concept directory for all the information.

The system accomplishes creating a personal knowledge base that contains the document analysis of the user as per Intra Document Analysis (Section 1) repeated for each document. This personal knowledge base is taken together with the public knowledge base by the Document Categorization algorithm described above, which then generates the conceptual directories.

(f) Conceptual Sharing: Once users have collections of documents, the desire to share them to create group collections is obvious. However, the problem of easy aggregating and sharing documents is compounded by the present need of users to specifically specify which documents to share or having simplistic and usually ineffective means of describing rules to share. The system allows for conceptual rules for sharing. It does this by allowing the user to specify which concepts and their subsequent related concepts should be shared to some other user or group. Thus a user is easy able to share all the documents regarding "java" with one user and "politics" with another very easily. It should be noted that these documents need not contain the terms but be related within certain tolerances to the concepts via the concept relationships in the knowledge base. Also a user is able to specify a collection of documents of interest by simply specifying the concepts of interest. The system can then find other public collections and can amalgamate them for the user and create the associated conceptual directory.

(g) User Profiling: At the heart of the matter, is the ability to predict what a user will do and what a user wants. To do this, the system need to get a good understanding of the user in a way that is usable and is of benefit to the user. The ability to understand what topics are of interest and conceptual patterns would be very useful.

For instance, a products page could be generated for the user full of products the user by his interests. Also, by understanding what concepts the user is in, the system can automatically generalize and determine other concepts the user would be interested in, but does not need to be specifically told. Also, application programmers can right business logic in terms of concepts and have a large applicability due to the systems ability to understand conceptual relations. This then allows for "Passive Solicitation" of products.

The knowledge base in conjunction with passive observation of the user will result in the system being able to determine a conceptual computing context being that of responding to and interacting with the user. This context can then be leverage by the OS, application, etc. to create more personalized and efficient responses and interaction. It has been understood that such information is useful, the problem has been that to obtain it the system the user was forced to configure the system. The system was not able to understand what concepts the user was actually interested in and how those concepts were related.

To determine the concepts of interest the system analyzes the documents that the user interacts with as per Intra Document Analysis (Section 1) and builds a conceptual directory as per the Automated Filing mentioned above. It is then able to leverage this conceptual directory to gain an understanding of the concepts of interest and the different emphasis of interest based on how many documents are found under the top-level categories and to a lesser extent their subcategories. This then creates a conceptual profile of the user than can be leveraged by other applications. An example of this would be a web site that iteratively creates the above-mentioned conceptual profile as a user navigates the web site in question. This information can then be used to create better-targeted advertisements or suggested pages of interest.

(h) Conceptual Communities: As stated above, people like communities where they can talk to people with similar interest. The problem has been that up till now people were matched up in simplistic manners with must knowledge involved. The knowledge base allows the system to be able passively understand the user's interest and will be able to match them up with others who share similar (related) interests. The system does this by looking at the conceptual profile of each user and creates a similarity metric. The similarity metric will take into account the number of identical concepts, the associated conceptual interest level, and the amount of conceptual connectivity between conceptual profiles leveraging the conceptual relationships in the knowledge base. From this similarity metric standard clustering mechanisms can be used to create the communities.

Also, the depth and breath of a user's interests can be determined which will allow the system to determine who is an expert in a particular field. This can be very valuable as part of an intranet or globally. The system accomplishes this by looking at the conceptual profile as well as the average technicality of the users documents and differentiation of the users conceptual profile with respect to other conceptual profiles as to the similarity/dissimilarity and breadth and depth of the material of interest.

(i) Conceptual Model of Users: Very similar to conceptual communities the system can leverage web logs, user collections, etc. to determine user conceptual profiles as well as conceptual communities. The system can leverage such knowledge from a variety of different sources such as different web logs from different sites to create models of users based on conceptual interest. These models will then be used to help the system infer a more complete conceptual profile of a new user from minimal data.

VI. Section 5: Knowledge Based Services

As shown in the reference figures, FIGS. 10-11, 28-29), in the following discussion, Section 5 deals with leveraging the semantic and user knowledge bases that have been generated to:

1. enable the automated generation of an organized web site from a base set of documents;
2. the retrieval of relevant daily news regarding or relating to topics of interest;
3. leveraging document conceptual similarity and user concept profiles to better preemptive web server caching;
4. the creation of new knowledge by allowing for the conceptual and temporal comparison of documents and collections; and
5. better advertisements through targeted conceptual ads.

(a) Automated Website Generation: As more information is being created and stored, the need for automated ways of managing large numbers of documents is becoming and is extremely important. Also, with connectivity and information flow increasing, it is necessary to be able to make available in an organized manner the large amounts of information.

Since the system can categorize documents, understand document similarities and differences on a conceptual level, the system can create a categorized directory for all the documents as well as provide intelligent and useful searching capabilities of the corpus in question. This is very similar to "Automated Filing", but the end interface needs to slightly different. However, the manner in which the conceptual directory and navigation is determined would be similar.

In addition the system would be able to highlight, and create blurbs (short summaries). Thus, the creating of an entire content web site can be automated. Thus with the addition of rules, such as specifying what documents to highlight and when, a content oriented website can be automated.

(b) Personalized News: People are always looking for ways to get the news that they want in a fast and convenient way. As the number of news sources that are available increases, the ability of any one human to find all the news that is desired decreases significantly. However, through both passive observation and input of topics of interest, the system can leverage the semantic knowledge web to determine if a possible news article is indeed of interest of the user. The system accomplishes this by first analyzing Intra Document Analysis (Section1) the daily news from n different sources. Then through leveraging the user conceptual profile and additional specifications of topics of interest, the system can determine the relevance of each news article to the user. The actual metric can be a combination of the semantic scores for the concepts in the conceptual profile as well as how related the article is to the conceptual profile leveraging the semantic knowledge web in the knowledge base. All the relevant news articles can be filtered and then organized by grouping like documents together, providing conceptual directories, by relevance to main topics of interest, by time and other sorting means in a manageable and coherent manner.

(c) Caching: The ability of a web server to quickly serve users is based on its ability to determine what pages are of interest to the users and when. The logic for caching, on the web or not, needs to be able to determine the conceptual significance of a page as well as how it relates to other pages for a given user's present interest. This in conjunction with user past behavior, with web servers this comes in the form of web logs, will allow the system to be able to predict users actions in a way that is a significant improvement than before.

The system accomplishes by creating a user conceptual profile. If the amount of information in the conceptual profile is limited, the system can take advantage of its model of users to extrapolate possible additional interests. It then looks what links are most likely to be of interest given the current content of the document and the user conceptual profile. It does this by looking at the similarity of associated documents in question and the semantic score of the concepts in the associated documents as related to the conceptual profile. In this way the system can anticipate the user and pre-fetch the possible desired document into main memory for faster future response. Also, by looking at the conceptual flows of the web site, the system will be able to correlate this with previous user behavior to improve both its model of users and caching metrics.

Figure 10A:
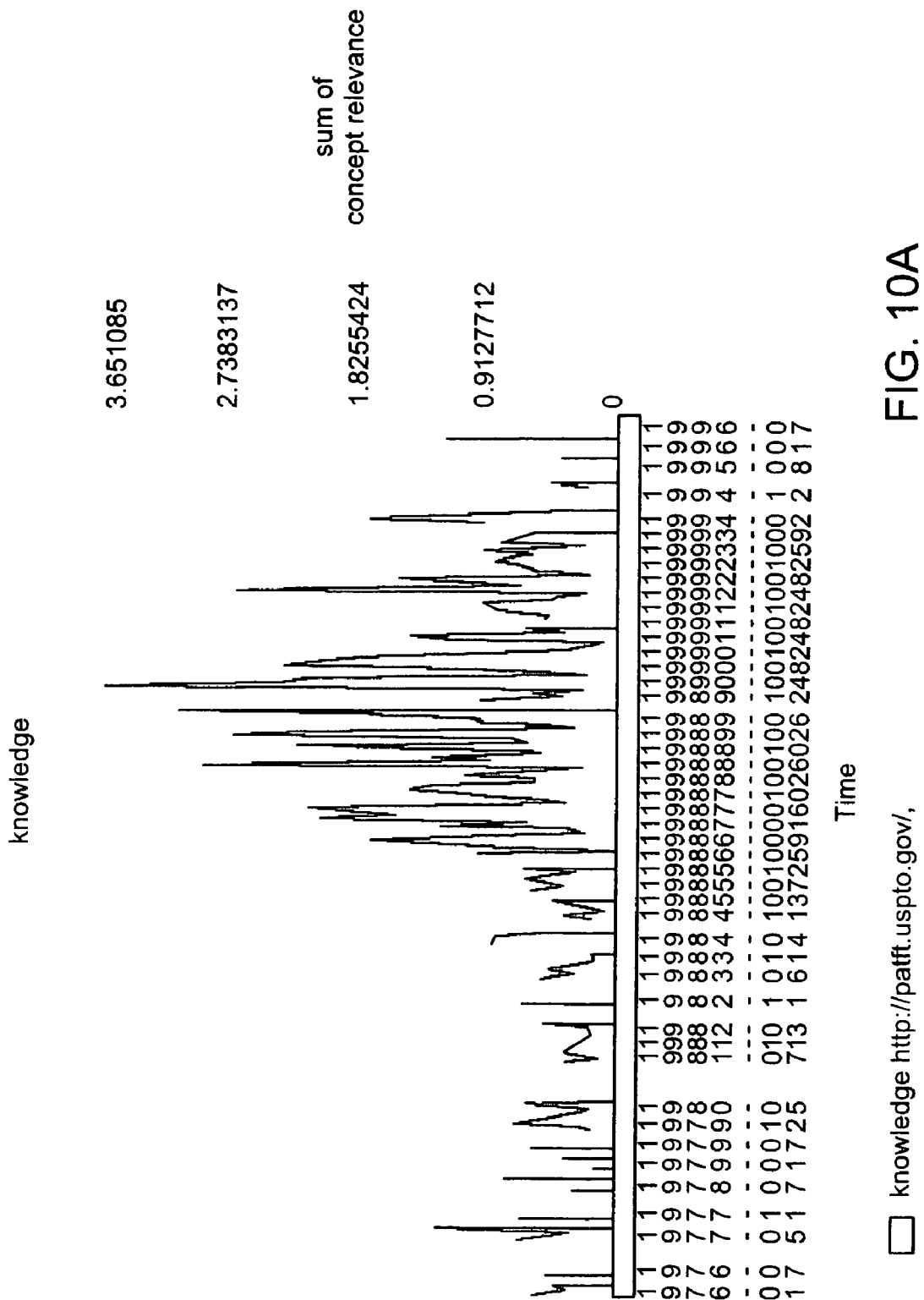
FIG. 10A-10B depicts an example of a collection intelligence graph.
Figure 10B:
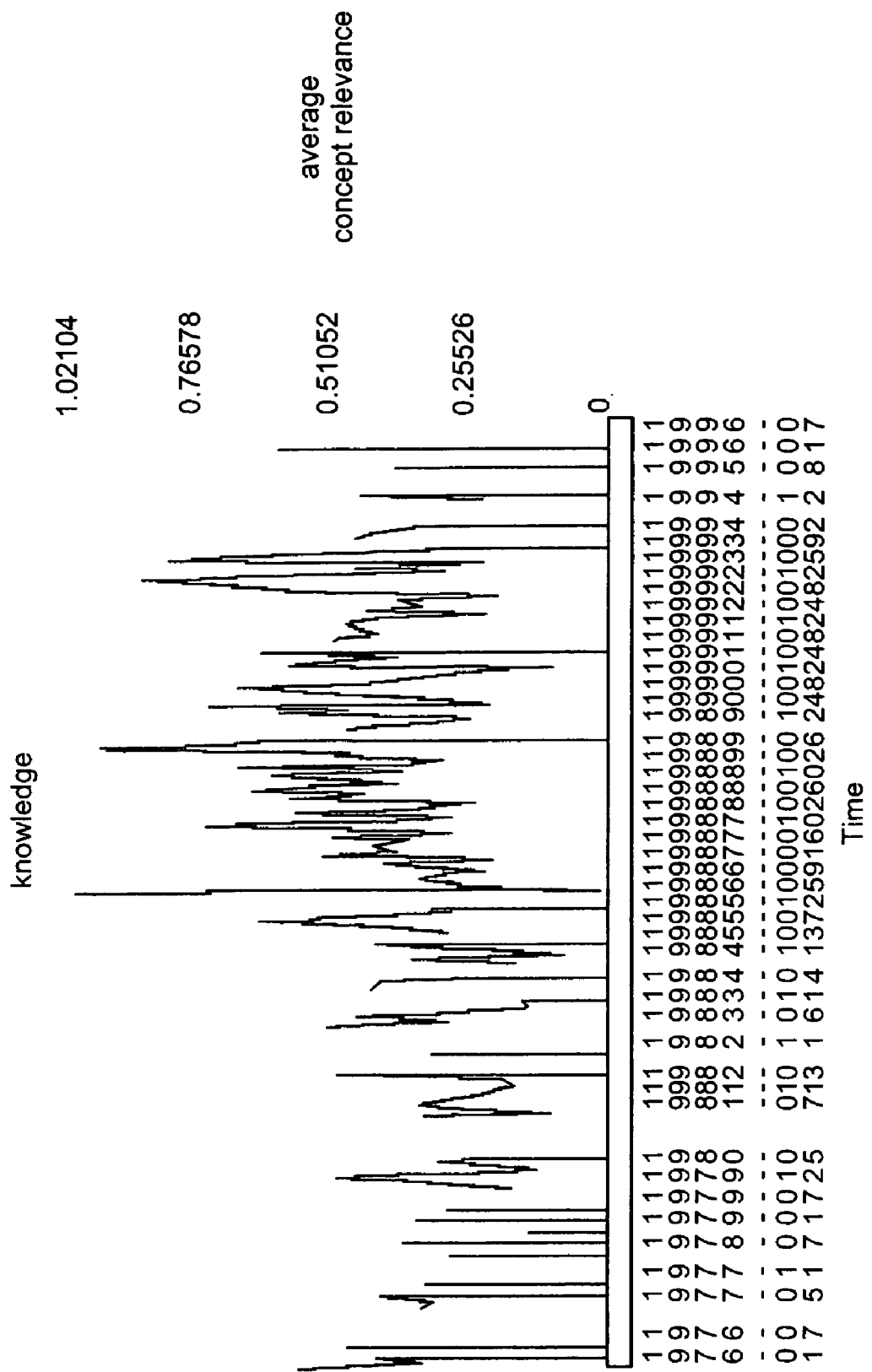
Figure 11A:
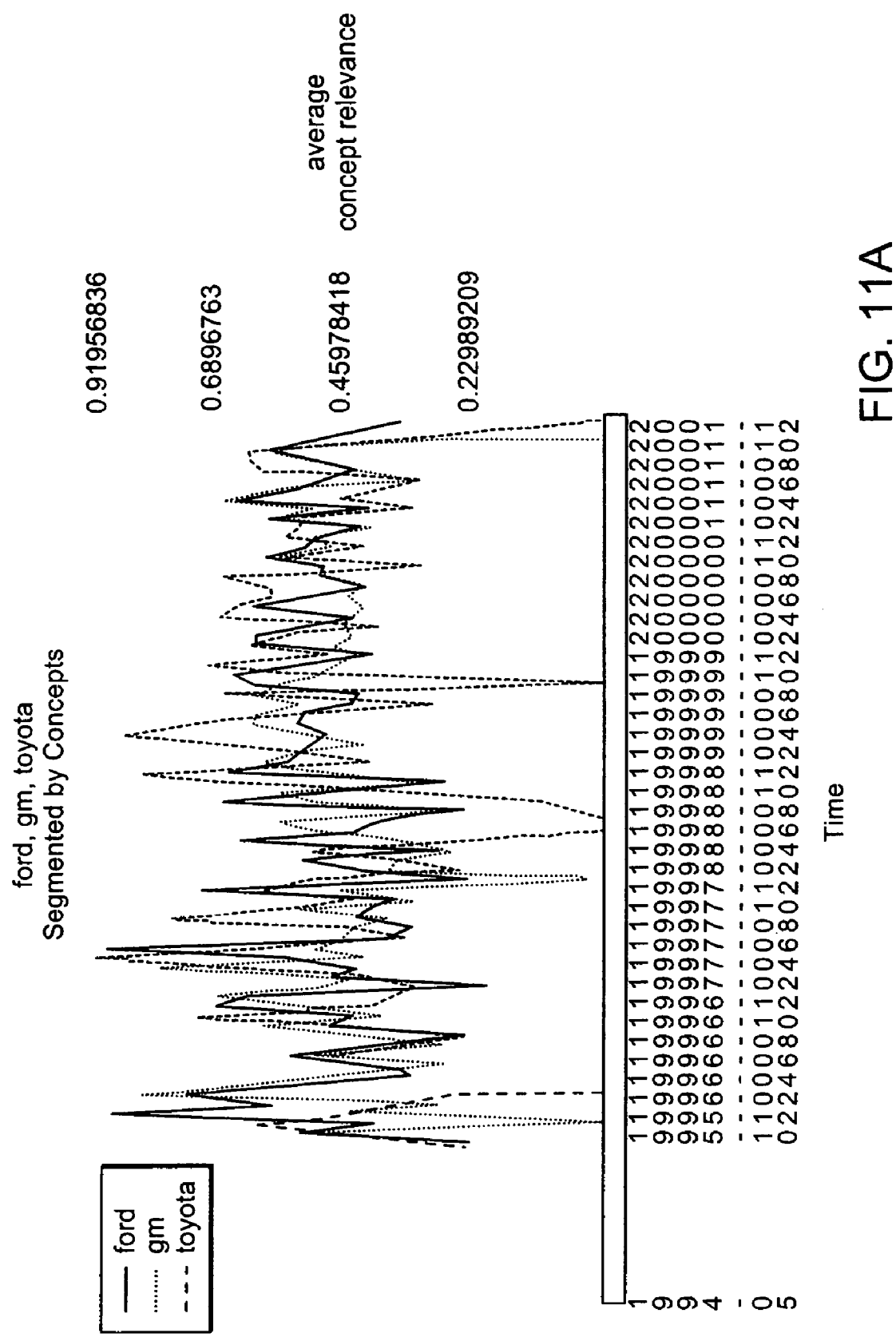
FIG. 11A-11B depicts another example of a collection intelligence graph.
Figure 11B:
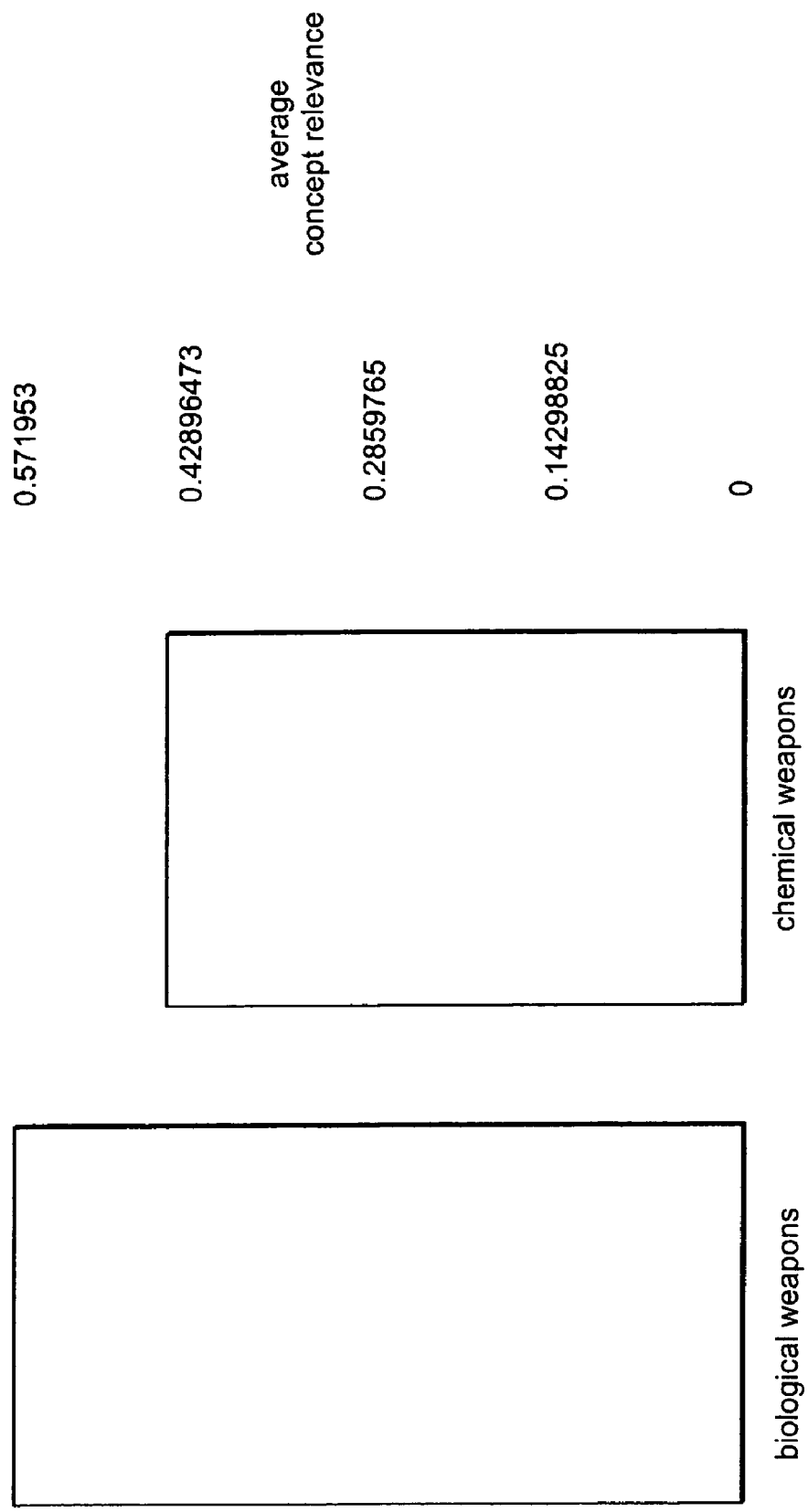

(d) Collection Intelligence: The ability to amalgamate disparate pieces of information to synthesize new knowledge is based on the ability to make conceptual relationships between documents as well as categorization of documents under general categories. Through the generation of collection concept maps, the system is able to classify and group documents together. This can then be used with an understanding of the relevant date of the document to generate temporal conceptual trends. The system accomplishes this by having for each document a set of concept, semantic score values, document concept relationships, and if possible a relevant date. The conglomeration of such information can lead to the creation of graphs (figures) that are able to exemplify a number of different characteristics of the data. Reference is made to FIGS. 10 and 11.

Thus to find out the temporal concept trend of "knowledge" in a randomly selected set of about 10,000 patents, the system would first find the patents that contain or are strongly related to the concept "knowledge" and then leverage its knowledge of the associated date to derive a graph representing the trend information. Below are a number of examples that illustrate a few of the possible pieces of information that can be generated:

(e) Marketing/Conceptual Targeted Advertising: Online advertising is one of the most important revenue generation streams for websites. However, presently available methods to target advertisement are not able to understand the relationships between products/services and content on a page except for matching keywords and best.

With a knowledge base of semantic relationships as well the ability to analyze product/service documentation and derive automatically the associated concepts and their relationships to other concepts will enable for a whole brand new method of target advertising that is painless and easy. Secondly, with web logs and conceptual flow analysis, new insights can be gained as to how and why and when a user will actually find an advertisement interesting and useful. Also, these insights can lead to business logic that is both understandable to humans and machines through the use of the augmented semantic knowledge base that is generated via the above processes.

In another embodiment, the invention provides a method for automated semantic knowledge. FIGS. 13, 14, 15 describe the flowcharts for the same. Accordingly, FIG. 13 describes a method for determining the concepts, associated semantic relevance, and, associated relationships of possible concepts from a given document (1302). The method comprises the steps of examining the given structure of an input document such as a web page, or any other information (step 1304). After determining the important sections of the structure, the text is formatted, and fragments, sentences, etc based on format as well as punctuation and other syntax are generated (step 1306). A determination of the possible important words based on structural highlighting (Capitalization, italics, . . . ), neighboring sentences, correlative words is made (1308). All words and possible important words are examined, when a "distance graph" is generated (1310).

The transitivity principle is applied (step 1312) to the distance graph and the locality of entries to determine actual important words is examined. This step is further followed by examining macroscopic structure of fragments and sentences. After this, taking subsets of structure, including only important words, a graph is constructed based upon intersections of sentences and fragments as well as proximity (1314). The graph represents possible concepts as well as relationships between concepts (1316). The method provides a transitivity step and a graphical analysis is conducted of graph with respect to each node of the graph (1318). A new relationship values is generated based on relationships to other nodes by treating each node as a center of an anti-gravity field; results in n asymmetric graphs (1318). Then the method provides for analyzing each of the n nodes with the other nodes and comparing differences in the n asymmetric graphs. Then a graph of relative semantic relevance; i.e., relevant strength with relationships between each node is generated (1320).

Further, the method provides for generating an ordering with semantic relevance of Concepts based on each node's relationship to all connecting nodes; by examining, of each pair of nodes, which is stronger and which is weaker in each pair by looking at the ratio of the weights of a relationship in the associated asymmetric graphs. A graph is generated showing two possible concepts and semantic weight between them (1322). This information generated above is examined with respect to macroscopic structure of sentences and fragments. Then, applying conventional heuristics and empirical rules a concepts list with "concept scores" ordered from more general to more specific is generated (1324). Finally, using the semantic ordering and the concept relations graph, a graph is generated of general concept mapped to more specific concepts and their relation (1326).

FIG. 14 describes the process flowchart for summary generation. In this method, full sentences and fragments are examined using concept scores to determine a semantic relevance for each sentence/fragment. This takes into account concepts that a user has specified as being of more interest. Then, a summary of desired length is generated.

FIG. 15 describes the steps involved in inter document analysis. According to this method, each document is analyzed according to the process and flowchart as described in FIG. 13. Then, the hierarchy of documents dictated by the topology of the collection is determined. Then, the inverted filter is applied by allowing concepts of documents lower in the topological hierarchy to affect documents above. This step is followed by applying appropriate heuristics for the modification of the semantic scores such as leveraging difference in top-hierarchy level and page type.

FIG. 16 describes the steps involved in document categorization using inter document analysis. First, each document is analyzed under FIG. 13 (Step 1602) to determine the possible concept's semantic relevance and associated relationships. The system undertakes a relevance analysis (Step 1604) to determine which concepts and conceptual relations are relevant to the set of documents. It then examines relationships in the concept graph to determine which of the concepts are best for categorizing an individual document for each document in the set. This is the categorization of concepts to documents step as shown in Step 1606 of FIG. 16. The semantic score of the concepts is obtained (1608) and the concept categories are chosen (1610). The conceptual directory system over all the concepts is then obtained (Step 1612).

FIGS. 17 and 18 relate to Generating and Inferring new knowledge as described in Section 3. FIG. 17*b* depicts the steps performed for obtaining a collection dictionary. After inputting several documents and undergoing analysis according to FIG. 13, a subset of possible categories or concepts is chosen that are not too ubiquitous or too specific.(Step 1706). Of the remaining concepts, the related concept graph is obtained by requesting the associated collection concepts relationships. (Step 1708). Intra Document analysis is performed (Step 1710) and top semantic ranked categories are chosen (Step 1712). The adaptive directory is created (as seen in FIG. 21) for each of the chosen categories (Step 1714). For each category, the fitness of the category by its sub categories is determined (Step 1716) and human rules are applied to the remaining top level categories (Step 1718). FIG. 18 shows the steps for obtaining similar concepts. Again, after inputting a collection of documents, or webpages, and undergoing analysis as per FIG. 13, a subset K of all concepts are created per FIG. 17 (1806). The system does this by generating an adaptive directory (described in FIG. 21) for the concept in question (1808). Depending on such factors and the semantic scores and the concept relation graph, the K is paired down to those most likely to have similar concepts. For each concept C in K, those concepts with similar positions in the overall concept relation graph will be considered as possibly similar (Step 1810). For those that are possibly similar, the related concept graph of each is compared (Step 1812). If two concepts provide similar structure to the graph, they are considered generally similar. This can be mapped to determining the similarity of concepts in a particular context if necessary.

FIGS. 19 through 27 show different flowcharts for leveraging the knowledge data base and the creation of a user oriented knowledge base (Section 4). After inputting several documents, a knowledge data base is generated using techniques described in FIGS. 13 through 18 above (Step 1904). Concepts are associated with executable pieces of code that can be linked together in a generic manner (Step 1906). The system then determines and executes if a sequence of concepts expresses as a complex request to be executed (Step 1908). The system may determine if a concept is not able to be bound to either a piece of code or data and can then query the user as to further specification (Step 1910). FIG. 20 similarly, from a generated knowledge base acquired, determines concepts and their associated semantic ordering requested by the user (step 2004). The system then leverages this semantic ordering, if present, to provide results that match the semantic ordering given (Step 2006). Documents which match not only the concepts but the semantic ordering are given preference, compared to those that might contain the concepts but do not match the desired concept ordering. The system is able to leverage its understanding of semantic relevance of the concepts and is able to determine a metric by which both the relevance as well as semantic ordering are taken into account to provide vastly improved search results (Step 2008). Additionally, the system can leverage its ability to understand similar concepts in a context (described in FIG. 21) to be able to automatically expand the search parameters while still guaranteeing relevant results (step 2010).

FIG. 21 describes the steps performed by the system in creating an adaptive directory by use of concept maps. By using the already generated knowledge data base created by previous flowcharts, given a set of concepts, the system queries the knowledge base for which concepts are related, both more generally and more specifically (step; 2104). If there is more than one concept it looks for concepts that relate to both of the concepts. It then takes these concepts and determines the relationships between each pair. Using this information it is able to determine which concepts group/partition the set of associated concepts the best (step 2106). Also, the system is able to determine possible contexts (step 2108) for the initial set of concepts given. Once the associated concepts have been determined (step 2110) the relationships between these concepts are obtained to determine the associated concept graph. This graph is then analyzed to determine which concepts are the sub categories. Those concepts that are able to act as a category for both the request as well as the subcategories are then chosen as contexts for the adaptive directory (2112). Further, similar concepts are determined as described in FIG. 18, resulting in an adaptive context dependent directory (step 2114).

FIG. 22 shows the flowchart for natural language querying. After generating the knowledge base from a collection of documents, given a natural language query (NLQ), the knowledge base will first identify the possible concepts (step 2204). It will then look at the relationships specified in the query vs. the relationships it already knows and determine the type of query to execute (step 2206). Thus, given the natural language sentences (NLSs), the system will determine the K concepts and the possible relations between them. It will query the user if multiple possible hierarchical, relational and Boolean choices exist (step 2208). Thus the request will more semantically match the desired users request and subsequently will generate more precise answers (step 2210).

FIG. 23 shows steps for automated individual and group filing. The system uses the generated knowledge base from a collection of documents inputted using the techniques already discussed earlier (step 2302). Then, the system creates a personal knowledge base (step 2304) that contains the document analysis of the user according to Intra document analysis (section 1) repeated for each document. This personal knowledge is taken together with the public knowledge base by the Document Categorization algorithm described above (FIG. 16).

FIG. 24 is a flowchart describing concept sharing. Again, from a generated knowledge base (step 2402), the system allows the user to specify which concepts and the subsequent documents and their related concepts should be shared to some other user or group by leveraging the knowledge base automatically generated (step 2404). The user, then is able to specify a collection of documents of interest by simply specifying the concepts of interest. The system can then find other public collections and can amalgamate them for the user and create the associated conceptual directory (step 2406).

FIG. 25 is a flowchart for user profiling. From the generated knowledge base (step 2502) described earlier, to determine the concepts of interest the system analyzes the documents that the user interacts with as per Intra document analysis of Section 1, and builds a conceptual directory as per the automated filing mentioned above (step 2504). It is then able to leverage this conceptual directory to gain an understanding of the concepts of interest and the different emphasis of interest based on how many documents are found under the top-level categories and to a lesser extent their subcategories (step 2506). This creates a conceptual profile of the user (step 2508) that can be leveraged by other applications. This information can be made at run time as well as over multiple sessions.

FIG. 26 is a flowchart depicting conceptual communities. The generated knowledge base (step 2602) allows the system to be able to passively understand the user's interest and will be able to match them up with others who share similar, related interests (step 2604). The system does this by looking at the conceptual profile of each user and creates a similarity metric based on a variety of factors, such as, concepts, relatedness, etc. (step 2606). From this similarity metric standard, clustering mechanisms can be used to create the communities (step 2608). Further, the depth and breadth of a user's interests can be determined which will allow the system to determine who is an expert in a particular field (step 2610). This can be made available as part of an intranet or globally.

FIG. 27 is a flowchart depicting conceptual models of users. The generated knowledge base (step 2702) from a collection of documents is used. Very similar to conceptual communities, the system can leverage web logs, user collections, etc. to determine user conceptual profiles as well as conceptual communities (step 2704). The system can leverage such knowledge from a variety of different sources such as different web logs from different sites to create models of users based on conceptual interest (step 2706). These models will then be used to help the system infer a more complete conceptual profile of a new user from minimal data (step 2708).

FIGS. 28 and 29 relate to knowledge based services. FIG. 28 is a flowchart depicting personalized news. The generated knowledge base from a collection of documents is used (step 2802). Daily news from n different sources is analyzed using Intra document analysis (step 2804). Using the user conceptual profile and additional specifications of topics of interest, the system can determine the relevance of each news article to the user (step 2806). All the relevant news articles can be filtered and then organized by grouping like documents together, providing conceptual directories, by relevance to main topics of interest, by time and other sorting means in a manageable and coherent manner (step 2808).

FIG. 29 is a flowchart depicting caching. Using previously generated knowledge base (step 2902), the system creates a user conceptual profile (step 2904). If the amount of information in the conceptual profile is limited, the system takes advantage of its model of users to extrapolate possible additional interests (step 2906). It then determines what links are most likely to be of interest given the current content of the document and the user conceptual profile (step 2908). Thus, the system can anticipate the user and pre-fetch the possible desired document into main memory for faster future response. The system, further, looks at conceptual flows to correlate this with previous user behavior to improve both its model of users and caching metrics (step 2910).

In another embodiment, the present invention also includes software steps that may be embodied in machine-executable software instructions, and thus the present invention includes a method that is carried out in a processing system as a result of a processor executing the instructions. In other embodiments, hardware elements may be employed in place of, or in combination with, software instructions to implement the present invention.

The foregoing is merely illustrative of the principles of this invention, and various modifications can be made by those skilled in the art without departing from the scope and spirit of the invention. In particular, those skilled in the art will appreciate that the methods, systems and devices described herein can include devices, systems, and software other than those described herein, and thus the examples set forth herein are provided by way of illustration only and not by limitation.

The invention claimed is:

1. A system having a memory for generating a document summary, the system comprising:
receiving means for receiving a set of documents, the documents comprising a collection of related symbols wherein document structure specifies relationships between and among the symbols;
graph generating means, in communication with the receiving means, for generating, based on the received set of documents, conceptual graphs indicative of relevance of concepts or sub-concepts within one or more documents in the set of documents, the graph generating means comprising
a semantic relevance filter for testing groups of concepts or sub-concepts as possible conceptual centers of semantic relevance and determining which concepts are semantically central and which are peripheral, thereby generating semantic relevance relationship vectors that define the relative semantic relevance between and among concepts in each document, wherein the semantic relevance filter utilizes information structure inherent in the documents in testing groups of concepts or sub-concepts, the information structure including any of symbol position, symbol co-proximity, highlighted symbols, or consecutive groupings of symbols, and wherein the testing process is iterated for each term, where the semantic relevance filter further comprises noise reduction means for removing noise from a document by analyzing the structure of the document, the noise reduction means including:
means for determining the grouping of concepts in the document;
means for determining a hierarchy among the concepts;
means for determining how information is distributed through the hierarchy; and
means for determining, based on the determined information distribution, what portion of the document is attempting to convey information;
and normalizing means, in communication with the testing means, for normalizing semantic relevance scores assigned to each concept, across the total number of concepts;
determining means, in communication with the graph generating means, for determining from the conceptual graphs a set of directed conceptual relation vectors, utilizing a selected heuristic, the heuristic including utilizing a derived semantic ordering to determine a direction of each vector, from general to specific; and
summary generating means, in communication with the determining means, for creating, based on the vectors, a summary of at least one document in the set of received documents, the summary being generated from sentences or sentence fragments in the document, the summary generating means including ranking means for ranking sentences or sentence fragments in accordance with any of core ideas contained therein or relationships expressed there between.

2. The system of claim 1 wherein the summary generating means can generate summaries of selected length.

3. The system of claim 2 wherein smaller summaries generated by the summary generating means are conceptually more compact than longer summaries.

4. The system of claim 1 wherein the summary generating means can generate summaries that favor or disfavor selected concepts or conceptual relationships.

5. The system of claim 1 wherein the noise reducing means utilizes information generated by the semantic relevance filter, representative of semantically relevant concepts and their distribution through the hierarchy of concepts in the document.

6. The system of claim 1 wherein the semantic relevance filter further includes means for utilizing available topological information to determine the semantic relevance of a concept of a given document or the semantic relationships between concepts.

7. The system of claim 6 wherein the means for utilizing topological information includes means for analyzing topological information in the form of a tree taxonomy including parent and child nodes.

8. The system of claim 7 wherein the topological information is available from any of a website hierarchy, a document hierarchy, or a file system hierarchy.

9. The system of claim 7 further comprising:
inverted filter means for utilizing the semantic relevance of a concept in a child node to modify the semantic relevance of a concept in a parent node.

10. The system of claim 1 further comprising means for generating conceptual maps of a collection of documents or subsets thereof.

11. The system of claim 1 further comprising means for creating new information structures from collections of documents.

12. The system of claim 11 further comprising means for collecting information from the Internet based on a user-specified universe of concepts.

13. The system of claim 11 wherein the system further comprises means for organizing collections of documents in accordance with user-specified parameters.

14. The system of claim 13 wherein the collections of documents are on a local processor.

15. The system of claim 13 wherein the collections of documents are on a remote processor.

16. The system of claim 11 further comprising means for generating an adaptive index of a collection of documents.

17. The system of claim 16 wherein the collection of documents is on a local processor.

18. The system of claim 16 wherein the collection of documents is on a remote processor.

19. The system of claim 1 further comprising means for collecting and organizing information from message boards.

20. The system of claim 1 further comprising means for filtering unwanted information from access by a user.

21. The system of claim 1 further comprising means for optimizing Web caching in accordance with conceptual semantic relevance.

22. The system of claim 1 further comprising means for optimizing analysis of information flow in accordance with conceptual semantic relevance.

* * * * *

UNITED STATES PATENT AND TRADEMARK OFFICE
CERTIFICATE OF CORRECTION

PATENT NO. : 7,571,177 B2  Page 1 of 1
APPLICATION NO. : 10/467251
DATED : August 4, 2009
INVENTOR(S) : Aditya Damle It is certified that error appears in the above-identified patent and that said Letters Patent is hereby corrected as shown below:

Title page, item [57], Abstract, line 6, "provides" should read --provide--.
Drawings, Figure 12 A, first column, fifth line "iformation" should read --information--.
Column 2, line 4, "of provide" should read --to provide--.
Column 2, line 16, "of provide" should read --to provide--.
Column 9, line 65, "donate" should read --denote--.
Column 10, line 1, "donate" should read --denote--.
Column 10, line 2, "donate" should read --denote--.
Column 10, line 9, "then" should be --than--.
Column 10, line 62, "interns" should read --turns--.
Column 12, line 51, "to ubiquitous to categories" should read --too ubiquitous to categorize--.
Column 13, line 16, "in" should read --is--.
Column 13, line 28, "Creati n f a User- riented Kn wledge Base" should read --Creation of a User-Oriented Knowledge Base--.
Column 16, line 19, "products the user" should read --products for the user--.
Column 16, line 47, "than" should read --that--.
Column 16, line 56, "must knowledge" should read --much knowledge--.
Column 16, line 57, "able" should read --able to--.
Column 18, line 18, "accomplishes by" should read --accomplishing this by--.
Column 18, line 21, "looks what" should read --looks at what--.
Column 23, line 37, "where the" should read --wherein the--.

Signed and Sealed this

Ninth Day of February, 2010

David J. Kappos
*Director of the United States Patent and Trademark Office*